United States Patent
Yamamoto et al.

(10) Patent No.: US 12,407,698 B2
(45) Date of Patent: Sep. 2, 2025

(54) INFORMATION PROCESSING DEVICE, INFORMATION PROCESSING METHOD, AND COMPUTER READABLE MEDIUM

(71) Applicant: Mitsubishi Electric Corporation, Tokyo (JP)

(72) Inventors: Takumi Yamamoto, Tokyo (JP); Kiyoto Kawauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 253 days.

(21) Appl. No.: 18/297,035

(22) Filed: Apr. 7, 2023

(65) Prior Publication Data

US 2023/0262075 A1   Aug. 17, 2023

Related U.S. Application Data

(63) Continuation of application No. PCT/JP2020/045452, filed on Dec. 7, 2020.

(51) Int. Cl.
*H04L 9/40* (2022.01)

(52) U.S. Cl.
CPC ...... *H04L 63/1416* (2013.01); *H04L 63/1441* (2013.01)

(58) Field of Classification Search
CPC ..... G06F 21/55; H04L 63/1425; H04L 63/14; H04L 63/1408; H04L 63/1433; H04L 63/1441; H04L 63/145
See application file for complete search history.

(56) References Cited

U.S. PATENT DOCUMENTS

| | | | |
|---|---|---|---|
| 2017/0061322 A1 | 3/2017 | Chari et al. | |
| 2017/0345294 A1* | 11/2017 | Hirotsu | G08G 1/0112 |
| 2018/0115568 A1 | 4/2018 | Du | |
| 2019/0034836 A1* | 1/2019 | Chari | G06N 20/20 |
| 2019/0080089 A1* | 3/2019 | Chen | G06N 20/10 |
| 2019/0294803 A1* | 9/2019 | Yamamoto | G06F 21/57 |
| 2019/0384910 A1 | 12/2019 | Orihara et al. | |
| 2021/0157909 A1 | 5/2021 | Yamamoto et al. | |
| 2023/0247035 A1* | 8/2023 | Matsubayashi | H04L 63/1425 726/23 |

FOREIGN PATENT DOCUMENTS

| | | |
|---|---|---|
| JP | 2015-114833 A | 6/2015 |
| JP | 2018-67304 A | 4/2018 |

(Continued)

OTHER PUBLICATIONS

Maryam Nezhadkamali, Android malware detection based on overlapping of static features, Oct. 26-27, 2017.*

(Continued)

*Primary Examiner* — Anh Nguyen
(74) *Attorney, Agent, or Firm* — Birch, Stewart, Kolasch & Birch, LLP

(57) ABSTRACT

A normal classification unit (101) extracts a true positive access that is known to be an access aimed to attack and that has been determined by a detection unit (102) to be an access aimed to attack. A modification unit (107) modifies a feature of the true positive access by using a feature of a true negative access that is known to be a normal access and that has been determined by the detection unit (102) to be a normal access.

11 Claims, 19 Drawing Sheets

(56) References Cited

FOREIGN PATENT DOCUMENTS

| JP | 6548837 B2 | 7/2019 |
| JP | 2019-185183 A | 10/2019 |
| JP | 6698956 B2 | 5/2020 |
| WO | WO 2018/159361 A1 | 9/2018 |
| WO | WO 2019/073557 A1 | 4/2019 |

OTHER PUBLICATIONS

International Search Report (PCT/ISA/210) issued in PCT/JP2020/045452, dated on Mar. 2, 2021,.
Steve T.K. Jan et al., "Throwing Darts in the Dark? Detecting Bots with Limited Data using Neural Data Augmentation", Security & Privacy 2020, (https://people.cs.vt.edu/vbimal/publications/syntheticdatasp20.pdf), 17 pages.
German Office Action for German Application No. 11 2020 007 653.9, dated Mar. 5, 2024, with partial translation.
Pham et al., "Generating Artificial Attack Data for Intrusion Detection Using Machine Learning", Proceedings of the 5th Symposium on Information and Communication Technology, 2014, pp. 286-291.
Chinese Office Action and Search Report for Chinese Application No. 202080107438.3, dated Apr. 30, 2025, with English translation.

\* cited by examiner

INFORMATION PROCESSING DEVICE, INFORMATION PROCESSING METHOD, AND COMPUTER READABLE MEDIUM

CROSS REFERENCE TO RELATED APPLICATIONS

This application is a continuation of PCT International Application No. PCT/JP2020/045452, filed on Dec. 7, 2020, all of which is hereby expressly incorporated by reference into the present application.

TECHNICAL FIELD

The present disclosure relates to an attack detection technique.

BACKGROUND ART

In recent years, a targeted attack that targets a specific company or a specific organization has been increasing. Due to networking of a control system, a cyber-attack on an important infrastructure such as a power plant or a gas plant has been a threat and has been a serious concern that threatens national security.

On the other hand, in the field of security monitoring, there is continuous shortage of staff who needs specialized knowledge. Therefore, there is a need for a technique that is able to detect a cyber-attack with high accuracy and efficiency, even with a small number of staff.

A rule-based detection technique has been known for a long time as a technique that monitors a cyber-attack. The rule-based detection technique uses a rule (signature) that detects a known malicious pattern or a rule that detects an attack technique or behavior of an attacker.

However, sophistication of attacks and an increase in unknown attacks have made it difficult to define a rule in advance and this has been bothering staff of a Security Operation Center (SOC). Further, it is required to manually adjust a rule for each system to be monitored. Therefore, the limit of the rule-based detection technique is approaching. For this reason, an advanced detection technique is desired in which a rule is not required to be defined in advance or a boundary that discriminates between normal and abnormal is automatically determined. As a technique to realize such advanced detection technique, Artificial Intelligence (hereinafter abbreviated as AI) such as machine learning is considered. The AI learns data on a plurality of classes prepared in advance and automatically finds a boundary that separates the classes. If a large amount of data for each class can be prepared, the AI is able to properly find the boundary. If the AI can be applied to monitor a cyber-attack, it is expected that the AI takes over defining and updating a rule which have been performed by staff who has specialized knowledge and skills.

However, in network security, there is a problem in that it is difficult to prepare a large amount of data for each class, which is the most important issue for the AI. An attack rarely occurs and it is very difficult to prepare a large amount of attack data for learning. Therefore, it is required to increase the attack data by using any kind of method and use the increased attack data for learning.

In addition, abilities of an attacker have been increasing day by day. The attacker nowadays fully investigates and understands information on an organization to be attacked, and launches an attack without being noticed by an attack detection system. An internal crime has been also increasing and it is considered that a sophisticated attack that utilizes the information on the organization to be attacked, will increase in the future. The sophistication of attack data is also required to cope with an attack that has been cleverly designed and developed to have features which are similar to features in a normal condition in order to avoid detection.

To solve a problem in that it is difficult to prepare a large amount of abnormal (attack) data that avoids detection, there are techniques that automatically generate a large number of attack samples that avoid detection and improve accuracy of an attack detection technique.

As existing techniques to generate attack samples that avoid detection, there are a technique of Patent Literature 1 and a technique of Patent Literature 2.

Patent Literature 1 discloses a technique to automatically generate for evaluating security products, sophisticated attack samples designed to have features similar to those in a normal condition. Patent Literature 2 discloses a technique to automatically generate for evaluating security products, a false detection (False Positive: FP) in which a normal event which is not supposed to be detected is detected and a detection omission (False Negative: FN) in which an event which is supposed to be detected is not detected.

Both techniques change a feature vector of an attack so as to cross a decision boundary of a normal model that has been obtained by learning behavior of normal data. Further, both techniques generate an attack on a simulated environment to have a feature corresponding to a feature vector that has crossed the boundary. Depending on both techniques, it is possible to generate a realistic and sophisticated attack by checking matters such as environment, a restriction on an attack or the like, and presence or absence of an attack function.

CITATION LIST

Patent Literature

Patent Literature 1: JP 6548837 B2
Patent Literature 2: JP 6698956 B2

SUMMARY OF INVENTION

Technical Problem

In the technique of Patent Literature 1 and the technique Patent Literature 2, a feature vector is modified so as to cross a decision boundary of a detection system on a feature space and search for a sample that avoids detection. For this reason, it has been difficult to efficiently apply these techniques to an attack detection technique in which a feature space is nonlinear and high-dimensional.

In general, the more highly accurate the attack detection system is, the more high-dimensional and nonlinear the feature space is. Therefore, it is difficult to inversely convert a representation on the feature space into information in a real space. Hence, it is difficult to acquire a sample existing in the real space, from an attack sample that avoids detection and found on the feature space. This search is expected to be haphazard and inefficient.

In view of the above, the present disclosure mainly aims to efficiently search for an attack that is actually able to exist in a real space and avoids detection.

Solution to Problem

An information processing device according to the present disclosure includes:

an extraction unit to extract a true positive access that is known to be an access aimed to attack and that has been determined by an attack detection system to be an access aimed to attack; and a modification unit to modify a feature of the true positive access by using a feature of a true negative access that is known to be a normal access and that has been determined by the attack detection system to be a normal access.

Advantageous Effects of Invention

According to the present disclosure, it is possible to efficiently search for an attack that is actually able to exist in a real space and avoids detection.

DESCRIPTION OF EMBODIMENTS

Embodiments will be described hereinafter with reference to the drawings. In the following description of the embodiments and the drawings, portions denoted by the same reference signs indicate the same or corresponding portions.

Embodiment 1

Overview

In the following, an access is called a true negative access, that is known to be a normal access and that has been determined by an attack detection system to be a normal access.

Further, an access is called a true positive access, that is known to be an attack access and that has been determined by the attack detection system to be an attack access.

Further, an access is called a false negative access, that is known to be an attack access aimed to attack, but that has been mistakenly determined by the attack detection system to be a normal access. The false negative access is an access that causes a detection omission.

Further, an access is called a false positive access, that is known to be a normal access, but that has been mistakenly determined by the attack detection system to be an attack access. The false positive access is an access that causes a false detection.

A normal log in which features of a normal access are indicated and an attack log in which features of an attack access are indicated, are used in the present embodiment. The normal log includes a plurality of fields and a value that represents a feature of the normal access is described in each field. Similarly, the attack log includes the same plurality of fields as those in the normal log and a value that represents a feature of the attack access is described in each field.

Then, in the present embodiment, a true negative access log is extracted from normal logs and a true positive access log is extracted from attack logs. In addition, in the present embodiment, a feature of a true positive access is modified by using a feature of a true negative access. In the present embodiment, the feature of the true positive access is modified so that a modified true positive access which is the true positive access whose feature has been modified is determined by the attack detection system to be a normal access. That is, in the present embodiment, the feature of the true positive access is modified so that the true positive access turns to a false negative access. In this way, in the present embodiment, an attack sample of a false negative access that is able to avoid detection operated by the attack detection system, is acquired by modifying the feature of the true positive access.

Description of Configuration

Figure 1:
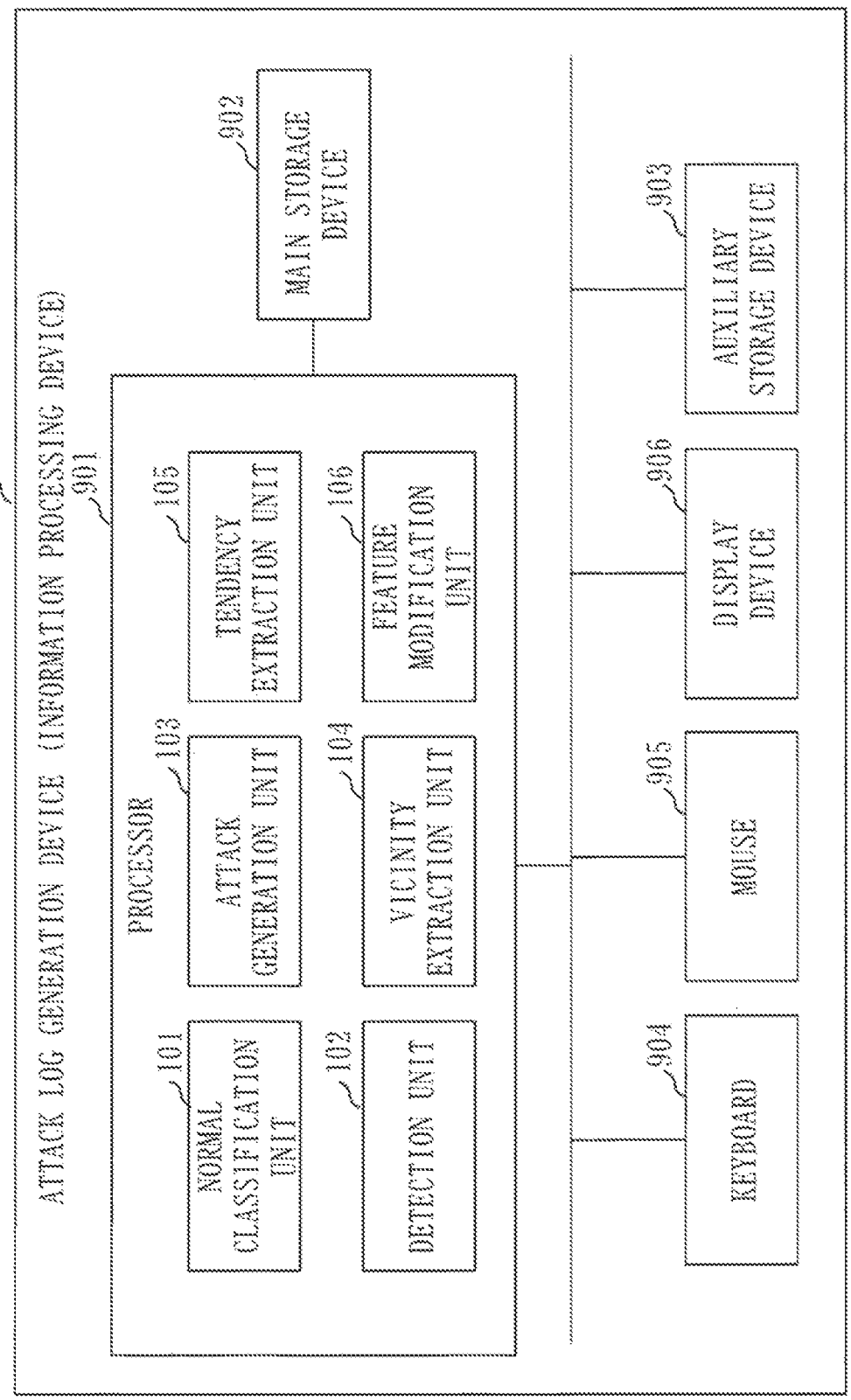
FIG. 1 is a diagram illustrating a hardware configuration example of an attack log generation device according to Embodiment 1.

FIG. 1 illustrates a hardware configuration example of an attack log generation device 100 according to the present embodiment. Further, FIG. 2 illustrates a functional configuration example of the attack log generation device 100 according to the present embodiment.

The attack log generation device 100 according to the present embodiment is a computer. The attack log generation device 100 is equivalent to an information processing device. Further, an operation procedure of the attack log generation device 100 is equivalent to an information processing method. Further, a program that implements operation of the attack log generation device 100 is equivalent to an information processing program.

As illustrated in FIG. 1, the attack log generation device 100 includes a processor 901, a main storage device 902, an auxiliary storage device 903, a keyboard 904, a mouse 905, and a display device 906, as pieces of hardware.

Figure 2:
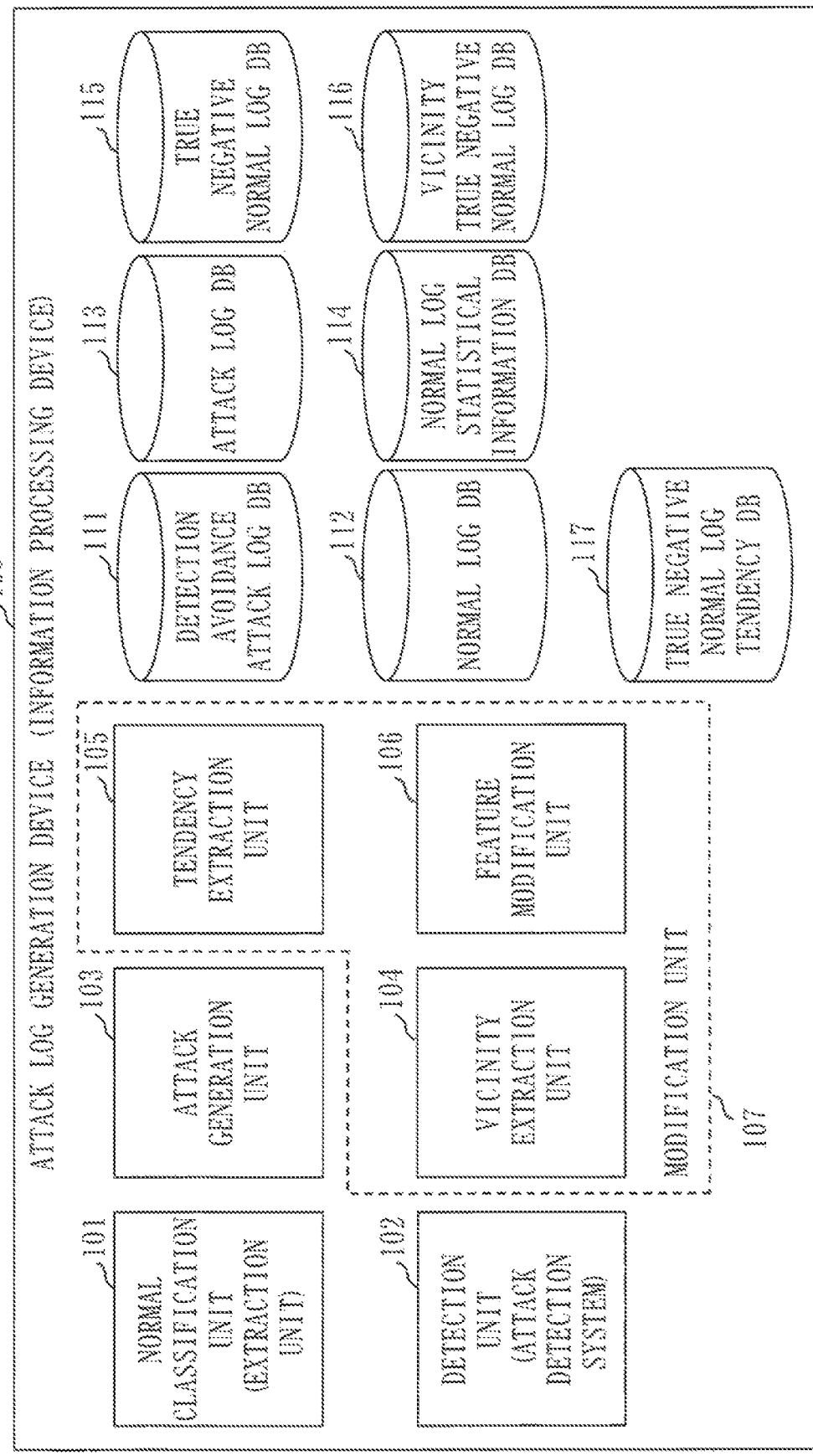
FIG. 2 is a diagram illustrating a functional configuration example of the attack log generation device according to Embodiment 1.

The auxiliary storage device 903 stores programs that implement functions of a normal classification unit 101, a detection unit 102, an attack generation unit 103, a vicinity extraction unit 104, a tendency extraction unit 105, and a feature modification unit 106 illustrated in FIG. 2.

These programs are loaded from the auxiliary storage device 903 into the main storage device 902. Then, the processor 901 executes these programs and performs operation of the normal classification unit 101, the detection unit 102, the attack generation unit 103, the vicinity extraction unit 104, the tendency extraction unit 105, and the feature modification unit 106 to be described below.

Figure 3:
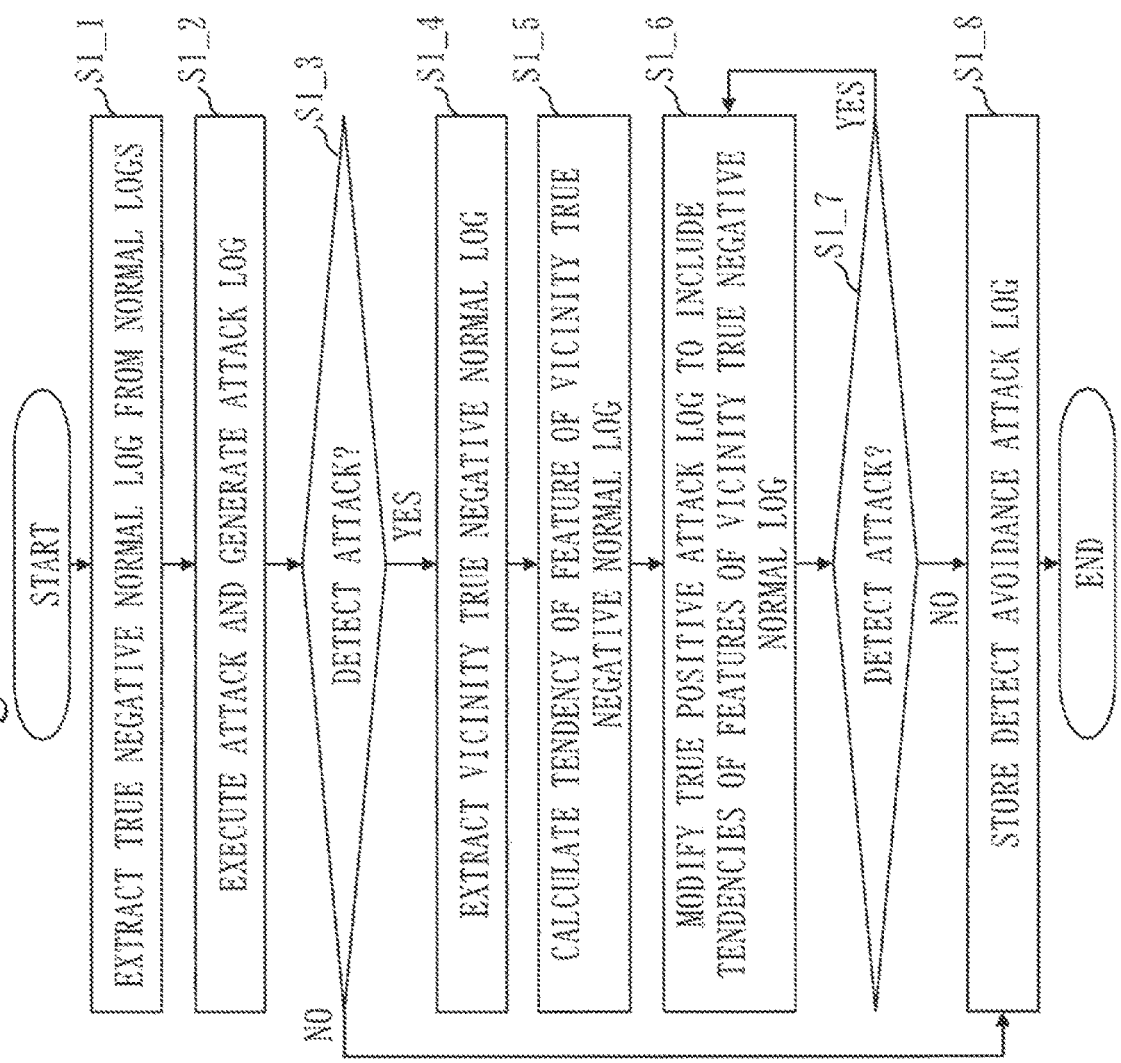
FIG. 3 is a flowchart illustrating an operation example of the attack log generation device according to Embodiment 1.

FIG. 3 schematically illustrates a state where the processor 901 executes the programs that implement the functions of the normal classification unit 101, the detection unit 102, the attack generation unit 103, the vicinity extraction unit 104, the tendency extraction unit 105, and the feature modification unit 106.

Further, a detection avoidance attack log Database (DB) 111, a normal log DB 112, an attack log DB 113, a normal log statistical information DB 114, a true negative normal log DB 115, a vicinity true negative normal log DB 116, and a true negative normal log tendency DB 117 illustrated in FIG. 2 are implemented by the main storage device 902 or the auxiliary storage device 903.

The keyboard 904 and the mouse 905 receive a command from a user of the attack log generation device 100. The display device 906 displays various information to the user of the attack log generation device 100.

The attack log generation device 100 may include a communication device not illustrated in FIG. 1.

In FIG. 2, the normal classification unit 101 extracts a true negative access. More specifically, the normal classification unit 101 extracts from normal logs in the normal log DB 112, a normal log in a true negative state that has been determined by the detection unit 102 to be normal. In the normal log, a feature of a normal access is described in a plurality of fields. That is, the normal log defines the normal access. For this reason, the true negative access is defined by the normal log in the true negative state (hereinafter referred to as the true negative normal log) extracted by the normal classification unit 101. The normal classification unit 101 sores the extracted true negative normal log in the true negative normal log DB 115.

Further, the normal classification unit 101 extracts a true positive access from attack logs. More specifically, the normal classification unit 101 extracts from the attack logs in the attack log DB 113, an attack log in a true positive state that has been determined by the detection unit 102 to be an attack. In the attack log, a feature of an attack access generated by the attack generation unit 103 is described in a plurality of fields. That is, the attack log defines the attack access. For this reason, the true positive access is defined by the attack log in the true positive state (hereinafter referred to as the true positive attack log) extracted by the normal classification unit 101. The normal classification unit 101 outputs the extracted true positive attack log to the vicinity extraction unit 104.

The normal classification unit 101 is equivalent to an extraction unit. Further, a process performed by the normal classification unit 101 is equivalent to an extraction process.

The detection unit 102 functions as the attack detection system.

More specifically, the detection unit 102 uses machine learning to detect an attack access. As described above, a normal log determined by the detection unit 102 to be normal is stored in the true negative normal log DB 115 by the normal classification unit 101, as the true negative normal log. Further, an attack log determined by the detection unit 102 to be an attack is output to the vicinity extraction unit 104 by the normal classification unit 101, as the true positive attack log.

The attack generation unit 103 generates an attack access along an attack scenario. Then, the attack generation unit 103 stores in the attack log DB 113, a log that represents features of the attack access, as the attack log.

The vicinity extraction unit 104, the tendency extraction unit 105, and the feature modification unit 106 are collectively referred to as a modification unit 107.

The modification unit 107 modifies the feature of the true positive access extracted by the normal classification unit 101, by using the feature of the true negative access extracted by the normal classification unit 101. More specifically, the modification unit 107 modifies the feature of the true positive access so that a modified true positive access which is the true positive access whose feature has been modified is determined by the detection unit 102 to be a normal access. Further, when the modified true positive access is determined by the detection unit 102 to be an attack access, the modification unit 107 modifies a feature of the modified true positive access by using a feature of the true negative access.

A process performed by the modification unit 107 is equivalent to a modification process.

The vicinity extraction unit 104 extracts from the true negative normal log DB 115, a true negative normal log in the vicinity of the true positive attack log (hereinafter referred to as a vicinity true negative normal log) extracted by the normal classification unit 101.

More specifically, the vicinity extraction unit 104 extracts from among true negative normal logs included in the true negative normal log DB 115, a true negative normal log having a feature similar to the feature of the true positive attack log, as the vicinity true negative normal log.

When there is a plurality of features in the true positive attack log, the tendency extraction unit 105 calculates an importance degree (feature importance) of each of the plurality of features of the true positive attack log. The tendency extraction unit 105 calculates the importance degree of each of the plurality of features of the true positive attack log so that higher importance degree is set to a feature which has higher degree of distinguishing between the true negative access and the true positive access.

Further, the tendency extraction unit 105 selects from the plurality of features of the true positive attack log, a feature whose importance degree matches with a selection condition.

The feature modification unit 106 modifies the feature of the true positive attack log selected by the tendency extraction unit 105, by using the corresponding feature of the true negative normal log.

Then, the feature modification unit 106 stores in the detection avoidance attack log DB 111, the true positive attack log after modification, as a detection avoidance attack log.

The detection avoidance attack log DB 111 stores detection avoidance attack logs.

The normal log DB 112 stores normal logs.

The attack log DB 113 stores attack logs.

The normal log statistical information DB 114 stores statistical information on normal logs (hereinafter referred to as normal log statistical information).

The true negative normal log DB 115 stores true negative normal logs.

The vicinity true negative normal log DB 116 stores vicinity true negative normal logs extracted by the vicinity extraction unit 104.

The true negative normal log tendency DB 117 stores tendencies of vicinity true negative normal logs (hereinafter referred to as true negative normal log tendencies) extracted by the vicinity extraction unit 104.

Description of Operation

Next, an operation example of the attack log generation device 100 according to the present embodiment will be described with reference to FIG. 3.

First, the normal classification unit 101 extracts a true negative normal log from normal logs (step S1_1).

More specifically, the detection unit 102 analyzes a large number of normal logs stored in advance in the normal log DB 112 and the detection unit 102 determines whether an access defined in a normal log is a normal access or an attack access.

Then, the normal classification unit 101 extracts a normal log determined by the detection unit 102 to be a normal access, as the true negative normal log.

Then, the normal classification unit 101 stores the extracted true negative normal log in the true negative normal log DB 115.

Next, the attack generation unit 103 executes an attack and generates an attack log (step S1_2).

That is, the attack generation unit 103 performs an attack access and generates the attack log in which the feature of the attack access is indicated. Then, the attack generation unit 103 stores the generated attack log in the attack log DB 113.

Next, the detection unit 102 analyzes the attack log and determines whether the access defined in the attack log is a normal access or an attack access (step S1_3).

When the detection unit 102 determines that the access defined in the attack log is the normal access (NO in step S1_3), the process proceeds to step S1_8.

In step S1_8, the access determined by the detection unit 102 to be the normal access is the attack access (false negative access) that is able to avoid detection operated by the detection unit 102, so that the normal classification unit 101 stores the corresponding true positive attack log in the detection avoidance attack log DB 111, as the detection avoidance attack log.

On the other hand, when the detection unit 102 determines that the access defined in the attack log is the attack access (YES in step S1_3), the process proceeds to step S1_4. That is, the access determined by the detection unit 102 to be the attack access is the attack access (true positive access) that is able to be detected by the detection unit 102. Therefore, it is required to modify the feature of the true positive attack log to avoid detection operated by the detection unit 102.

In step S1_4, the vicinity extraction unit 104 extracts a vicinity true negative normal log. That is, the vicinity extraction unit 104 extracts from the true negative normal log DB 115, a true negative normal log in the vicinity of the attack log (true positive attack log) acquired in step S1_3.

The detail of step S1_4 will be described below.

Next, the tendency extraction unit 105 calculates a tendency of a feature of the vicinity true negative normal log acquired in step S1_4 (step S1_5).

Next, the feature modification unit 106 modifies the true positive attack log so as to include the tendency of the feature of the vicinity true negative normal log, in the true positive attack log (step S1_6).

That is, the feature modification unit 106 modifies each field of the true positive attack log so as to include a lot of tendencies of features of the vicinity true negative normal log calculated by the tendency extraction unit 105.

Next, the detection unit 102 determines whether the access (modified true positive access) defined in the true positive attack log (modified true positive attack log) which has been modified by the feature modification unit 106, is a normal access or an attack access (step S1_7).

When the detection unit 102 determines that the modified true positive access is the normal access (NO in step S1_7), the normal classification unit 101 stores the modified true positive attack log in the detection avoidance attack log DB 111, as the detection avoidance attack log (step S1_8).

The modified true positive access based on the modified true positive attack log is not able to be detected by the detection unit 102 as an attack, so that the modified true positive access is an attack access that is able to avoid detection operated by the attack detection system. For this reason, the normal classification unit 101 stores the modified true positive attack log in the detection avoidance attack log DB 111, as the detection avoidance attack log.

On the other hand, when the detection unit 102 determines that the modified true positive access is the attack access (YES in step S1_7), the process returns to step S1_6. Then, the feature modification unit 106 further modifies the modified true positive attack log by using the features of the vicinity true negative normal log (step S1_6).

The above is the general flow of the operation of the attack log generation device 100.

The detail of the operation of the normal classification unit 101, the detection unit 102, the attack generation unit 103, the vicinity extraction unit 104, the tendency extraction unit 105, and the feature modification unit 106 will be described below.

The normal classification unit 101 causes the detection unit 102 to determine whether a large number of normal logs prepared in advance in the normal log DB 112 are normal or abnormal. The detection unit 102 determines whether a normal log is normal or abnormal. That is, the detection unit 102 determines whether a feature described in the normal log corresponds to a feature of a normal access or a feature of an attack access.

The normal classification unit 101 extracts a normal log determined by the detection unit 102 to be normal, as the true negative normal log. Then, the normal classification unit 101 stores the extracted true negative normal log in the true negative normal log DB 115. At this time, for categorical data (a domain, a method, a status code, or the like) of the normal log, the normal classification unit 101 calculates an occurrence frequency and a percentile of a unique value for each categorical data. Then, the normal classification unit 101 stores a dictionary consisting of a pair of the unique value and the percentile in the normal log statistical information DB 114, as normal log statistical information. The percentile is an index that arranges frequencies of unique values in ascending order and indicates what percentage a certain unique value falls in. The normal classification unit 101 may store instead of the pair of the unique value and the percentile, a dictionary consisting of a pair of the unique value and the occurrence frequency in the normal log statistical information DB 114, as normal log statistical information.

The detection unit 102 acquires a log (a normal log or an attack log) from the normal classification unit 101. Then, the detection unit 102 extracts a feature from the log and converts the extracted feature into a representation (feature vector) for inputting to a machine learning algorithm. Then, the detection unit 102 applies the feature vector to a learned detection model. In this way, the detection unit 102 estimates a class to which the log belongs.

A method of leaning a detection model by using learning data which has been provided with supervised information (a label) that indicates to which class of a normal access or an attack access the learning data belongs, is called supervised leaning.

When using the supervised learning, the detection unit 102 estimates by using the learned detection model, to which class of the normal access or the attack access the feature vector belongs.

A method of learning a detection model by using only normal data as learning data without preparing supervised information, is called unsupervised learning. When using the unsupervised learning, the detection unit 102 estimates by using the learned detection model, whether the feature vector belongs to the class of the normal access or not.

Figure 4:
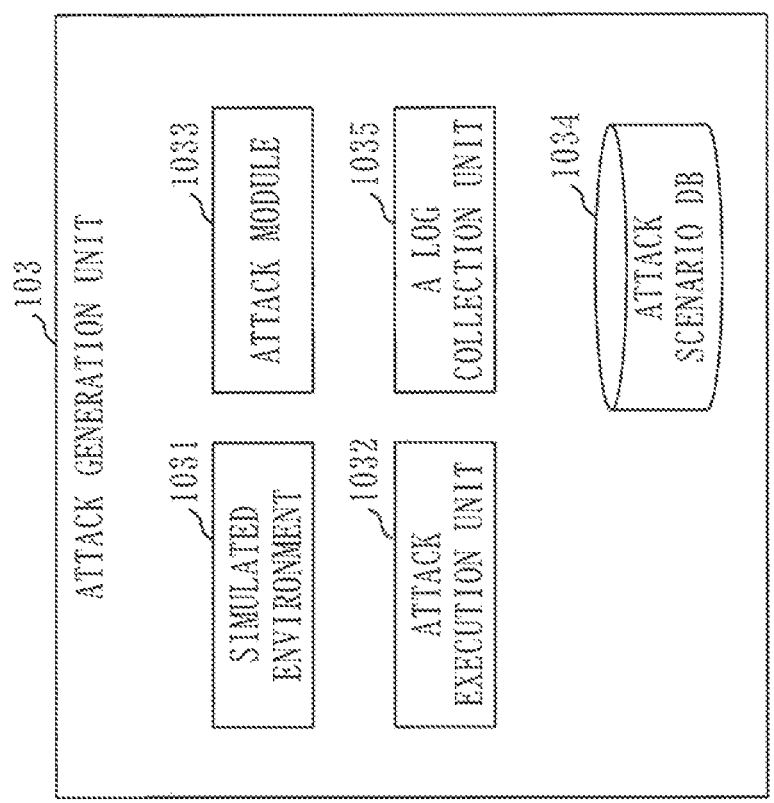
FIG. 4 is a diagram illustrating an internal configuration example of an attack generation unit according to Embodiment 1.

FIG. 4 illustrates an internal configuration example of the attack generation unit 103.

As illustrated in FIG. 4, the attack generation unit 103 is configured with a simulated environment 1031, an attack execution unit 1032, an attack module 1033, an attack scenario DB 1034, and a log collection unit 1035.

Figure 5:
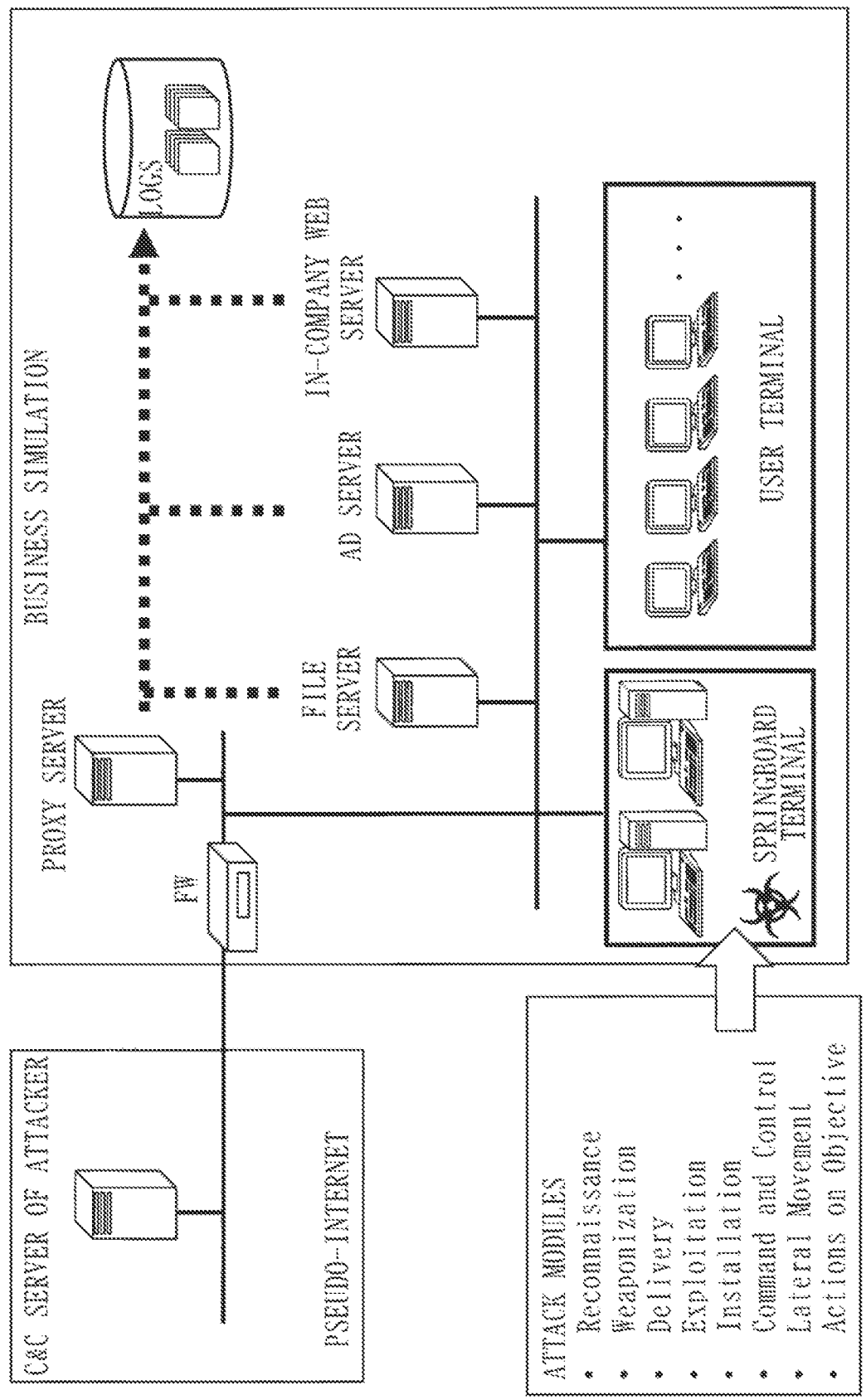
FIG. 5 is a diagram illustrating a configuration example of a simulated environment according to Embodiment 1.

FIG. 5 illustrates a configuration example of the simulated environment 1031.

The simulated environment 1031 is a virtual environment that simulates a business network of a company or an organization.

The simulated environment 1031 is configured with, for example, a proxy server, a firewall, a file server, an Active Directory (AD) server, an in-company Web server, a user terminal, a springboard terminal, and a pseudo-Internet. The pseudo-Internet includes a Command and Control server of an attacker.

The attack module 1033 is a plurality of basic modules that implements each step of Reconnaissance, Weaponization, Delivery, Exploitation, Installation, Command and Control, Lateral Movement, and Actions on Objective in Cyber Kill Chain.

Reconnaissance is a step to collect information (an e-mail address, or the like) on a target from public information or the like.

Weaponization is a step to generate an exploit kit, a malware, or the like used for an attack.

Delivery is a step such as transmitting to the target, an e-mail to which a malware is attached or an e-mail with a malicious link, or directly accessing a system of the target.

Exploitation is a step such as causing the target to execute an attack file such as the malware or causing the target to access to the malicious link.

Installation is a step to cause Exploitation to success and infect the target with the malware.

Command and Control (C&C) is a step to enable the malware and a C&C server to communicate with each other and enable the C&C server to perform remote operation on the target.

Lateral Movement is a step to enable the C&C server to use a local password hash to break into another computer.

Actions on Objective is a step to execute an objective of the attacker such as information exploitation, falsification, data destruction, or service suspension.

The attack module 1033 is a program that implements these functions.

The attack scenario DB 1034 stores attack scenarios.

The attack scenario is information in which a combination of attack modules 1033 and parameters (for example, a communication frequency, a communication destination domain, an infected terminal, or the like) are defined according to a general targeted attack. In order to have variations in the attack, a large number of attack scenarios are prepared in the attack scenario DB 1034.

The attack execution unit 1032 selects one attack scenario stored in the attack scenario DB 1034. Then, the attack execution unit 1032 executes the attack module 1033 on the simulated environment 1031 in obedience to the selected attack scenario.

The log collection unit 1035 collects logs on the simulated environment 1031 at a time of executing the attack and stores the collected logs as attack logs in the attack log DB 113.

The attack log includes, for example, a proxy server log, an AD server log, a file server log, a firewall log, or the like.

Figure 6:
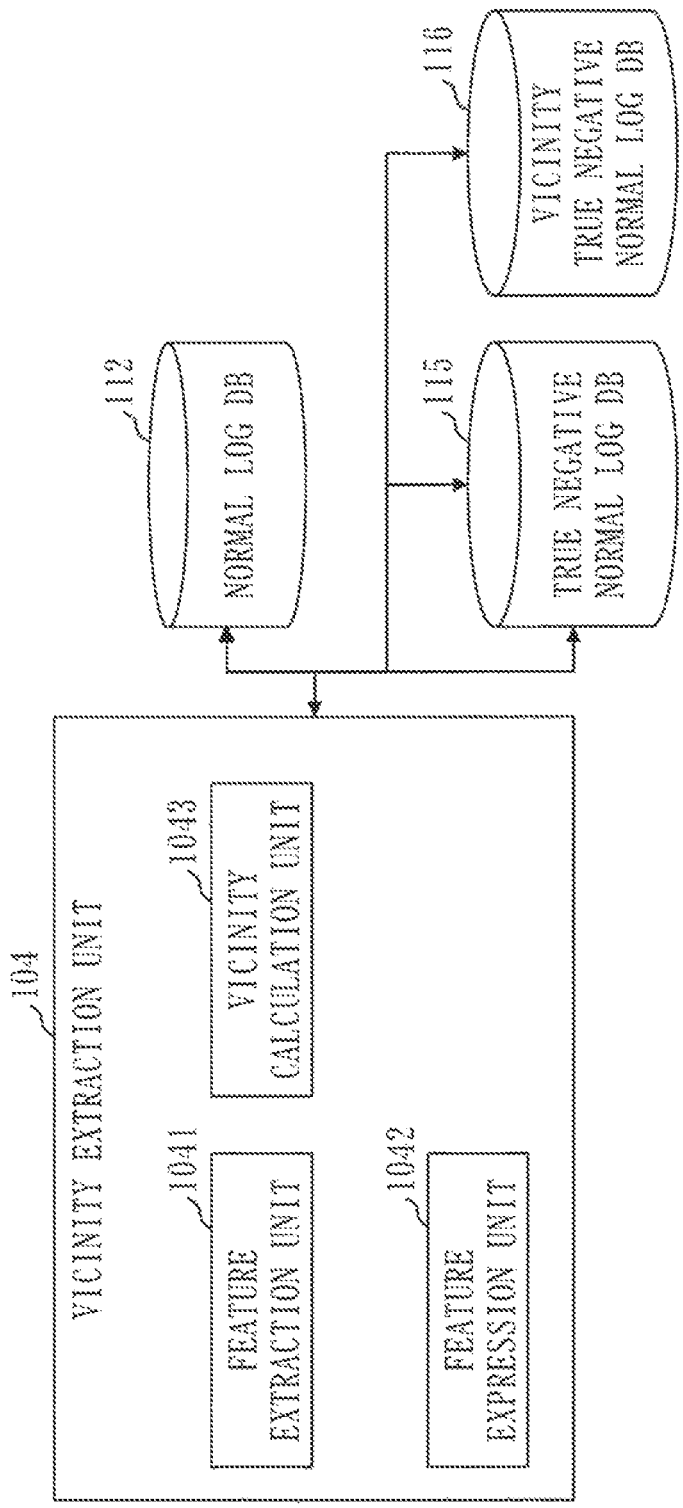
FIG. 6 is a diagram illustrating an internal configuration example of a vicinity extraction unit according to Embodiment 1.

FIG. 6 illustrates an internal configuration example of the vicinity extraction unit 104.

The vicinity extraction unit 104 is configured with a feature extraction unit 1041, a feature expression unit 1042, and a vicinity calculation unit 1043. Further, the vicinity extraction unit 104 uses the normal log DB 112, the true negative normal log DB 115, and the vicinity true negative normal log DB 116.

The feature extraction unit 1041 extracts prescribed features from x pieces (assuming one piece) of true positive attack logs and y pieces of true negative normal logs. y is a number sufficiently greater than x.

The feature expression unit 1042 converts the features extracted from true positive attack logs and true negative normal logs into forms (feature vectors) that are easily processed in a machine learning algorithm. The feature expression unit 1042 converts categorical data such as a domain, a method, or a status codec into for example, One-hot encoding, or Frequency Encoding described in the reference below.

Reference: Steve T. K. Jan, et al., Throwing Darts in the Dark? Detecting Bots with Limited Data using Neural Data Augmentation, Security & Privacy 2020 (https://people.cs.vt.edu/vbimal/publications/syntheticdata-sp20.pdf)

Further, the feature expression unit 1042 normalizes or standardizes numerical data. By normalizing or standardizing the numerical data, the feature expression unit 1042 makes uniform the size of numerical data between types of the features.

In addition, the vicinity calculation unit 1043 uses the feature vectors of the true positive attack logs and the feature vectors of the true negative normal logs to specify $K_0$ pieces of vicinity true negative normal logs in the vicinity of each of the true positive attack logs. The total number of true negative normal logs in the vicinity of x pieces of true positive attack logs is assumed to be $K_1$ pieces. $K_1 \geq K_0$. Then, the vicinity calculation unit 1043 stores the specified $K_0$ pieces of vicinity true negative normal logs in the vicinity true negative normal log DB 116.

The vicinity calculation unit 1043, for example, uses a K-nearest neighbor (KNN) method to specify $K_0$ pieces of vicinity true negative normal logs. The features or feature expressions to be used by the vicinity calculation unit 1043 to specify $K_0$ pieces of vicinity true negative normal logs may differ from features or feature expressions to be used by the detection unit 102. Further, the vicinity calculation unit 1043 uses Euclid distance or the like, as a distance scale.

Figure 7:
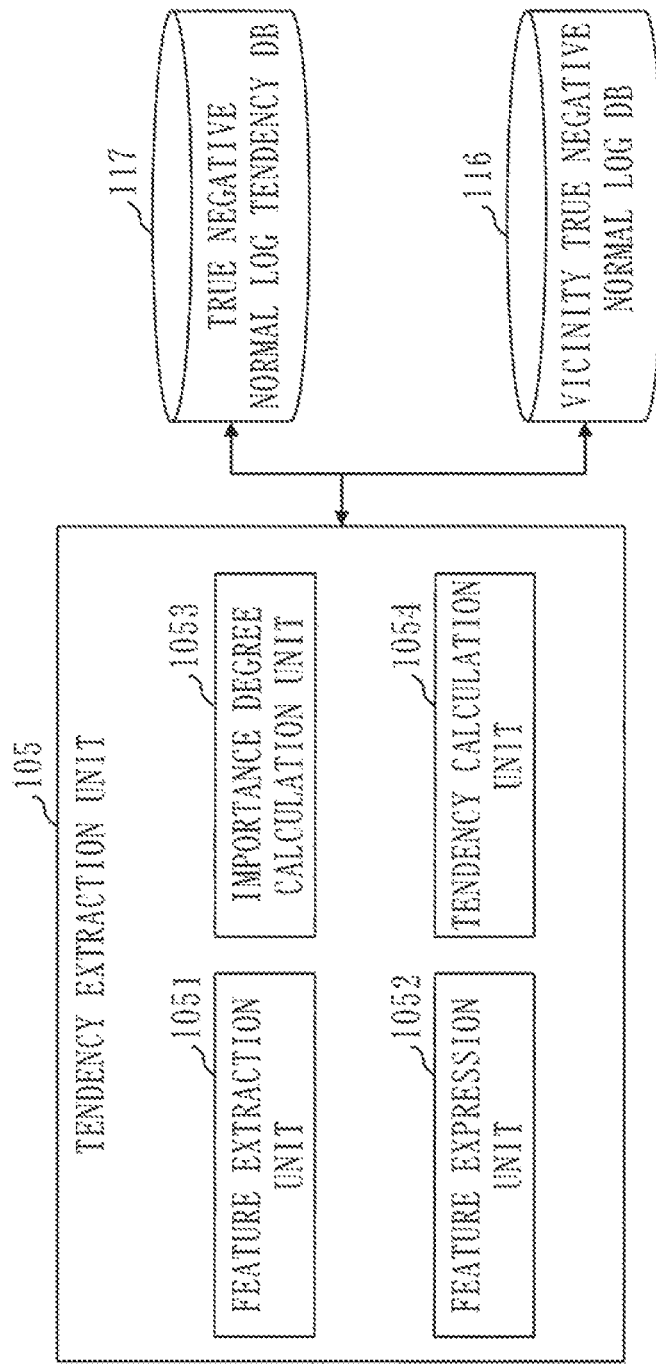
FIG. 7 is a diagram illustrating an internal configuration example of a tendency extraction unit according to Embodiment 1.

FIG. 7 illustrates an internal configuration example of the tendency extraction unit 105.

The tendency extraction unit 105 is configured with a feature extraction unit 1051, a feature expression unit 1052, an importance degree calculation unit 1053 and a tendency calculation unit 1054. Further, the tendency extraction unit 105 uses the vicinity true negative normal log DB 116 and the true negative normal log tendency DB 117.

The feature extraction unit 1051 acquires from the vicinity true negative normal log DB 116, $K_1$ pieces of vicinity true negative normal logs. Further, the feature extraction unit 1051, for example, acquires from the vicinity extraction unit 104, x pieces (assuming one piece) of true positive attack logs.

Then, similar to the feature extraction unit 1041, the feature extraction unit 1051 extracts the prescribed features from $K_1$ pieces of vicinity true negative normal logs and x pieces of true positive attack logs.

Similar to the feature expression unit 1042, the feature expression unit 1052 also converts the features extracted from $K_1$ pieces of vicinity true negative normal logs and x pieces of true positive attack logs into forms (feature vectors) that are easily processed in a machine learning algorithm. The features and feature expressions that are converted by the feature expression unit 1052 into the feature vectors may be different from features and feature expressions used by the detection unit 102.

The importance degree calculation unit 1053 uses the feature vectors acquired by the feature expression unit 1052 to learn a discriminator (C1) that distinguishes between $K_0$ pieces of vicinity true negative normal logs and x pieces of true positive attack logs. The importance degree calculation unit 1053 calculates for each of the feature vectors of the true positive attack logs, an importance degree of a feature (feature importance) which is a degree of distinguishing by the discriminator (C1) between $K_0$ pieces of vicinity true negative normal logs and x pieces (for example, 1 piece) of true positive attack logs. The importance degree calculation unit 1053 calculates the feature importance of each of the feature vectors so that higher importance degree is set to a feature which has higher degree of distinguishing between the vicinity true negative normal logs and the true positive attack logs.

Then, the importance degree calculation unit 1053 extracts features $F_{11}$ to $F_{1n1}$ which are the highest $n_1$ features as to the importance degree. $n_1$ is greater than or equal to 1. For example, the importance degree calculation unit 1053 calculates an importance degree with using random forest.

The tendency calculation unit 1054 acquires statistical information on the features $F_{11}$ to $F_{1n1}$ of $K_1$ pieces of vicinity true negative normal logs. The tendency calculation unit 1054 acquires for a feature which is categorical data, a central value (median, $med_1$) and a most frequent value (mode, $mod_1$) of a percentile in the categorical data, as the statistical information. Further, the tendency calculation unit 1054 acquires for a feature which is numerical data, a mean ($\mu_1$) and a standard deviation ($\sigma_1$) of the numerical data, as the statistical information.

Then, the tendency calculation unit 1054 stores the statistical information in the true negative normal log tendency DB 117.

Figure 8:
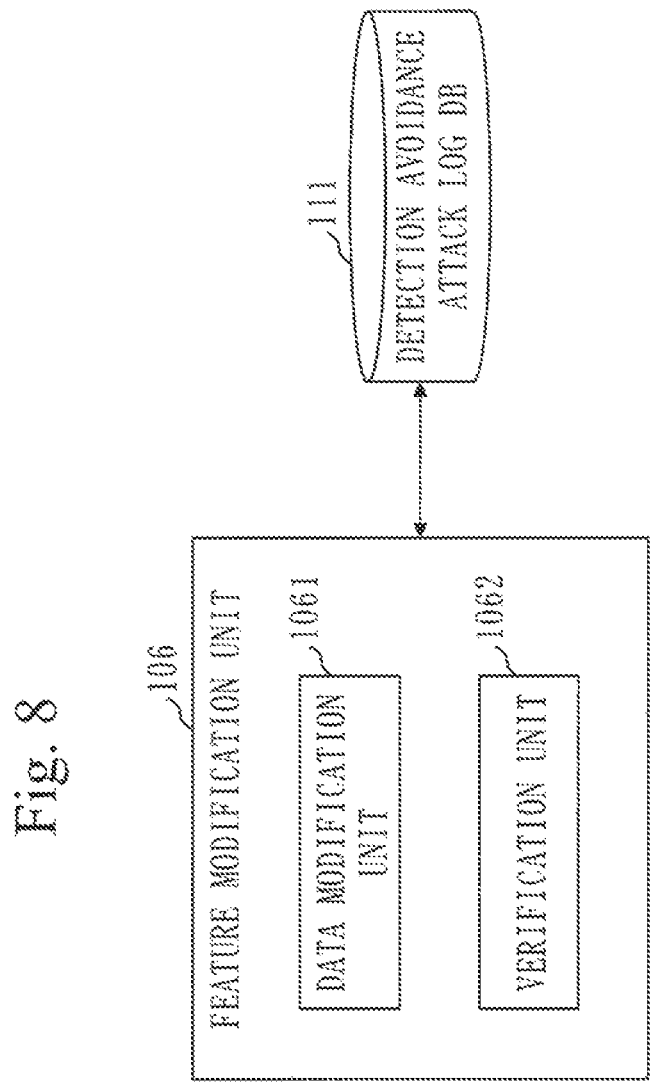
FIG. 8 is a diagram illustrating an internal configuration example of a feature modification unit according to Embodiment 1.

FIG. 8 illustrates an internal configuration example of the feature modification unit 106.

The feature modification unit 106 is configured with a data modification unit 1061 and a verification unit 1062. The feature modification unit 106 uses the detection avoidance attack log DB 111.

Figure 9:
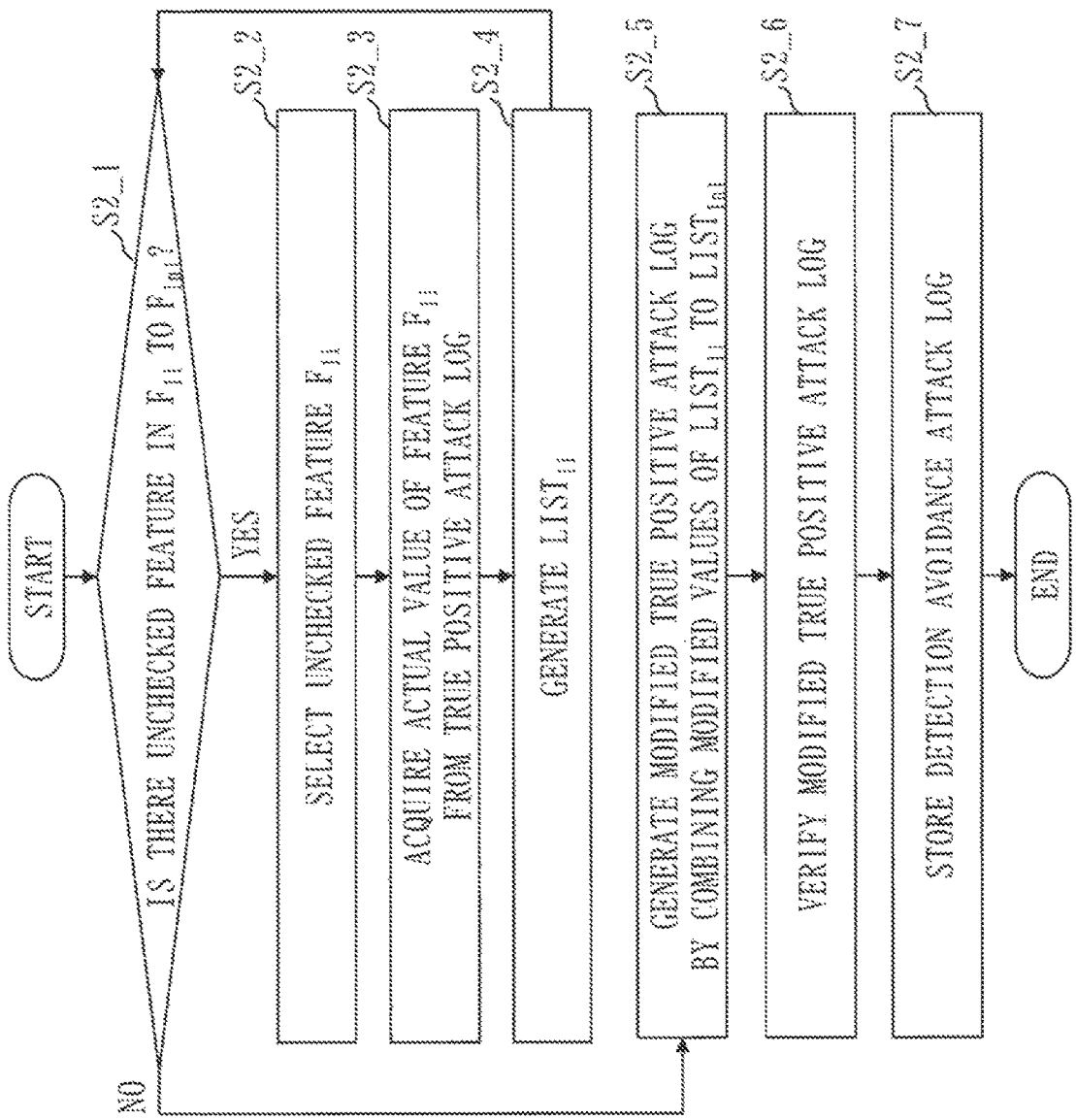
FIG. 9 is a flowchart illustrating an operation example the feature modification unit according to Embodiment 1.

FIG. 9 illustrates an operation example of the data modification unit 1061 and the verification unit 1062.

First, the data modification unit 1061 checks whether there is an unchecked feature among the features $F_{11}$ to $F_{1n1}$ (step S2_1).

When there is the unchecked feature (YES in step S2_1), the data modification unit 1061 selects an unchecked feature $F_{1i}$ (i is any of 1 to n1) (step S2_2).

In the following, operation of the data modification unit 1061 will be described in a case where the feature $F_{1i}$ is the feature $F_{11}$, as an example.

Next, the data modification unit 1061 acquires an actual value of the feature $F_{11}$ from a corresponding field in the true positive attack log (step S2_3).

Then, the data modification unit 1061 generates a $list_{11}$ (step S2_4). The $list_{11}$ includes a modified value acquired by modifying the actual value of the feature $F_{11}$ of the true positive attack log with an actual value of the feature $F_{11}$ of the vicinity true negative normal log. That is, the $list_{11}$ includes a plurality of modified values in which values of the feature $F_{11}$ of $K_1$ pieces of vicinity true negative normal logs have been reflected.

A method of generating the $list_{11}$ will be described below.

The data modification unit 1061 also performs for other features $F_{12}$ to $F_{1n1}$, the processes from step S2_2 to step S2_4.

When the processes from step S2_2 to step S2_4 are performed for all features $F_{11}$ to $F_{1n1}$ (NO in step S2_1), the data modification unit 1061 combines all modified values included in the $list_{11}$ to a $list_{1n1}$ of the features $F_{11}$ to $F_{1n1}$ and generates an attack log (modified true positive attack log) corresponding to each combination (step S2_5). When the number of modified values included in each list of the $list_{11}$ to the $list_{1n1}$ $r_{1j}$ (j is 1 to n1), a type of the generated attack log (modified true positive attack log) is $N=\Pi r_{1j}$. The actual value of the true positive attack log is hold in a field that does not correspond to the features $F_{11}$ to $F_{1n1}$.

Next, the verification unit 1062 verifies each modified true positive attack log (step S2_6).

Specifically, the verification unit 1062 causes the detection unit 102 to determine whether the access defined in each modified true positive attack log corresponds to any of a normal access and an attack access.

Then, the verification unit 1062 stores in the detection avoidance attack log DB 111, the modified true positive attack log that has been determined by the detection unit 102 to be the normal access, as the detection avoidance attack log (step S2_7). When X>1, the verification unit 1062 generates detection avoidance attack logs for all true positive attack logs, with using the same method.

Figure 11:
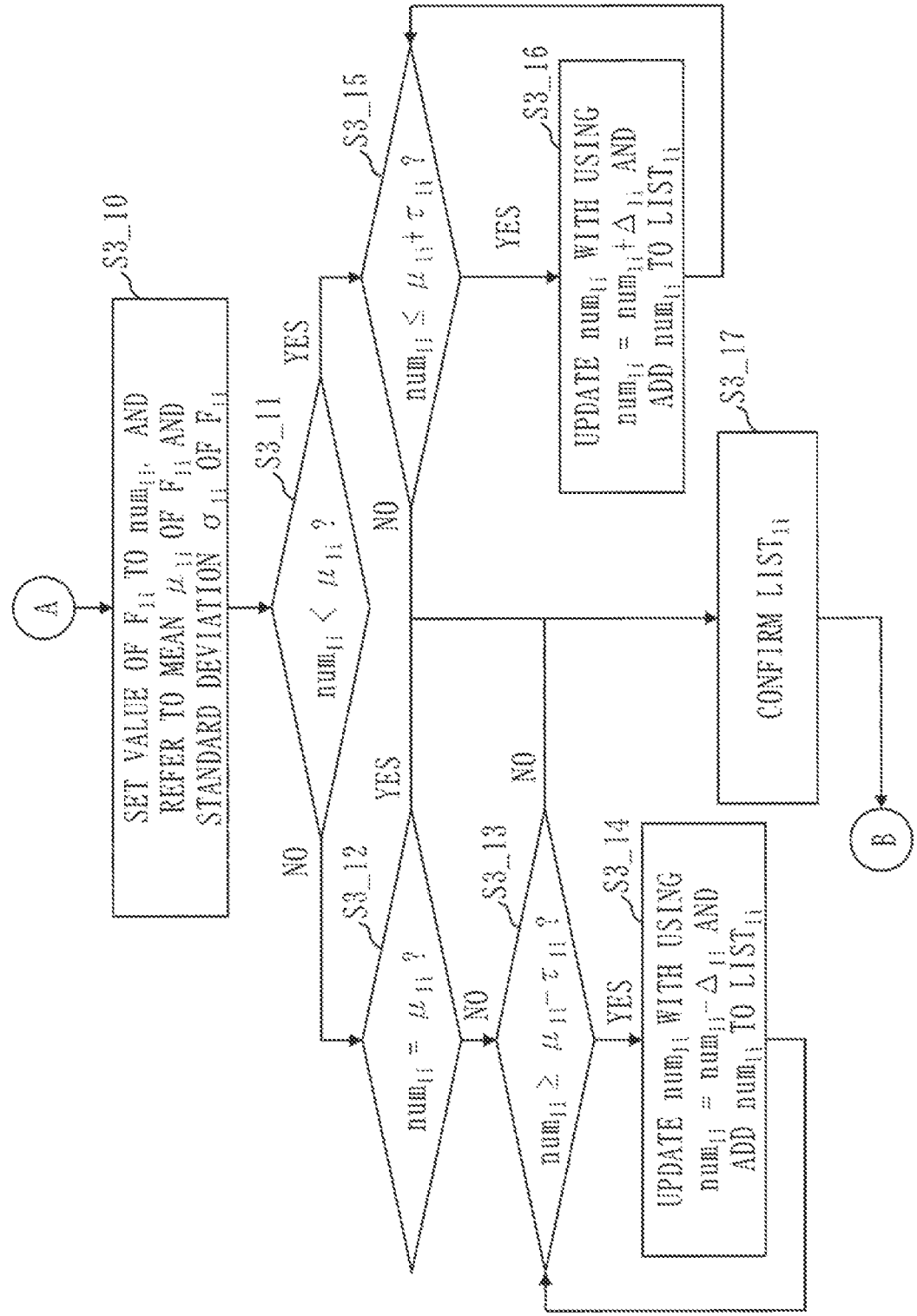
FIG. 11 is a flowchart illustrating an operation example of the feature modification unit according to Embodiment 1.

Next, a method of generating the list (the $list_{11}$ to the $list_{1n1}$) illustrated in step S2_4 of FIG. 9 will be described with reference to FIG. and FIG. 11. An example of generating the $list_{11}$ for the feature $F_{11}$ will be described below again.

The data modification unit 1061 determines whether the feature $F_{11}$ is categorical data or numerical data (step S3_1).

The categorical data is a domain, a method, a status code, or the like. The numerical data is a request size, a time interval, or the like.

When the feature $F_{11}$ is the categorical data, the data modification unit 1061 acquires from a dictionary in normal log statistical information, a value of a percentile of the categorical data of the feature $F_{11}$ and sets the acquired value of the percentile to $cat_{11}$ (step S3_2). Further, from the true negative normal log tendency DB 117, the data modification unit 1061 refers to a most frequent value $mod_{11}$, as the statistical information on the feature $F_{11}$ of $K_1$ pieces of vicinity true negative normal logs (step S3_2).

Next, the data modification unit 1061 compares a value of $cat_{11}$ with a value of $mod_{11}$ (step S3_3).

When the value of $cat_{11}$ is equal to or greater than the value of $mod_{11}$ (NO in step S3_3, NO in step S3_4, and YES in step S3_5), the data modification unit 1061 updates the value of $cat_{11}$ so that the value of $cat_{11}$ approaches (decreases) by $\Delta_{11}$ each to the value of $mod_{11}$ and adds the updated value of $cat_{11}$ to the $list_{11}$ (step S3_6). When the value of $cat_{11}$ has been already listed in the $list_{11}$, the data modification unit 1061 overwrites the already listed value of $cat_{11}$ with the new value of $cat_{11}$. $\Delta_{11}$ is a prescribed value.

The data modification unit 1061 repeats the process of step S3_6 while the value of $cat_{11}$ is greater than or equal to the value of $mod_{11}$ (YES in step S3_5).

When the value of $cat_{11}$ is less than the value of $mod_{11}$ (NO in step S3_5), the process proceeds to step S3_9.

When the value of $cat_{11}$ is equal to the value of $mod_{11}$ (NO in step S3_3 and YES in step S3_4), the process proceeds to step S3_9.

Further, when the value of $cat_{11}$ is less than the value of $mod_{11}$ (YES in step S3_3 and YES in step S3_7), the data modification unit 1061 updates the value of $cat_{11}$ so that the value of $cat_{11}$ approaches (increases) by $\Delta_{11}$ each to the value of $mod_{11}$ and adds the updated value of $cat_{11}$ to the $list_{11}$ (step S3_8). When the value of $cat_{11}$ has been already listed in the $list_{11}$, the data modification unit 1061 overwrites the already listed value of $cat_{11}$ with the new value of $cat_{11}$.

The data modification unit 1061 repeats the process of step S3_8 while the value of $cat_{11}$ is less than or equal to the value of $mod_{11}$ (YES in step S3_7).

When the value of $cat_{11}$ is greater than the value of $mod_{11}$ (NO in step S3_7), the process proceeds to step S3_9.

In step S3_9, the data modification unit 1061 confirms the $list_{11}$.

In step S3_1, when the feature $F_{11}$ is the numerical data, the data modification unit 1061 sets the value of the numerical data of the feature $F_{11}$ to $num_{11}$ (step S3_10). In addition, from the true negative normal log tendency DB 117, the data modification unit 1061 refers to a mean $\mu_{11}$ and a standard deviation $\sigma_{11}$ as the statistical information on the feature $F_{11}$ of $K_1$ pieces of vicinity true negative normal logs (step S3_10).

Next, the data modification unit 1061 compares a value of $num_{11}$ with a value of $\mu_{11}$ (step S3_11).

When the value of $num_{11}$ is greater than the value of $\mu_{11}$ (NO in step S3_11, NO in step S3_12, and YES in step S3_13), the data modification unit 1061 updates the value of $num_{11}$ so that the value of $num_{11}$ approaches (decreases) by $\Delta_{11}$ each to the value of $\mu_{11}$ and adds the updated value of $num_{11}$ to the $list_{11}$ (step S3_14). When the value of $num_{11}$ has been already listed in the $list_{11}$, the data modification unit 1061 overwrites the already listed value of $num_{11}$ with the new value of $num_{11}$.

$\Delta_{11}$ is a prescribed value. This $\Delta_{11}$ may be the same value as $\Delta_{11}$ used in a case where the feature $F_{11}$ is the categorical data, or may be a different value.

The data modification unit 1061 repeats the process of step S3_14 while the value of $num_{11}$ is greater than or equal to the value of $(\mu_{11}-\tau_{11})$ (YES in step S3_13). $\tau_{11}$ is also a prescribed value. For example, such as $3\times\sigma_{11}$, $\tau_{11}$ is considered to be defined with using a statistical value relating to the feature $F_{11}$.

When the value of $num_{11}$ is less than $(\mu_{11}-\tau_{11})$ (NO in step S3_13), the process proceeds to step S3_17.

When the value of $num_{11}$ is equal to the value of $\mu_{11}$ (NO in step S3_11 and YES in step S3_12), the process proceeds to step S3_17.

Further, when the value of $num_{11}$ is less than the value of $\mu_{11}$ (YES in step S3_11 and YES in step S3_15), the data modification unit 1061 updates the value of $num_{11}$ so that the value of $num_{11}$ approaches (increases) by $\Delta_{11}$ each to the value of $\mu_1$ and adds the updated value of $num_{11}$ to the $list_{11}$ (step S3_16). When the value of $num_{11}$ has been already listed in the $list_{11}$, the data modification unit 1061 overwrites the already listed value of $num_{11}$ with the new value of $num_{11}$.

The data modification unit 1061 repeats the process of step S3_16 while the value of $num_{11}$ is less than or equal to the value of $(\mu_{11}+\tau_{11})$ (YES in step S3_15).

When the value of $num_{11}$ is greater than the value of $(\mu_{11}+\tau_{11})$ (NO in step S3_15), the process proceeds to step S3_17.

In step S3_17, the data modification unit 1061 confirms the $list_{11}$.

After that, the data modification unit 1061 generates a $list_{12}$ to a $list_{1n1}$ for features $F_{12}$ to $F_{1n1}$ in the same procedure described above. After generating the $list_{11}$ to the $list_{1n1}$ has completed, the data modification unit 1061 operates step S2_5 in FIG. 9.

Figure 10:
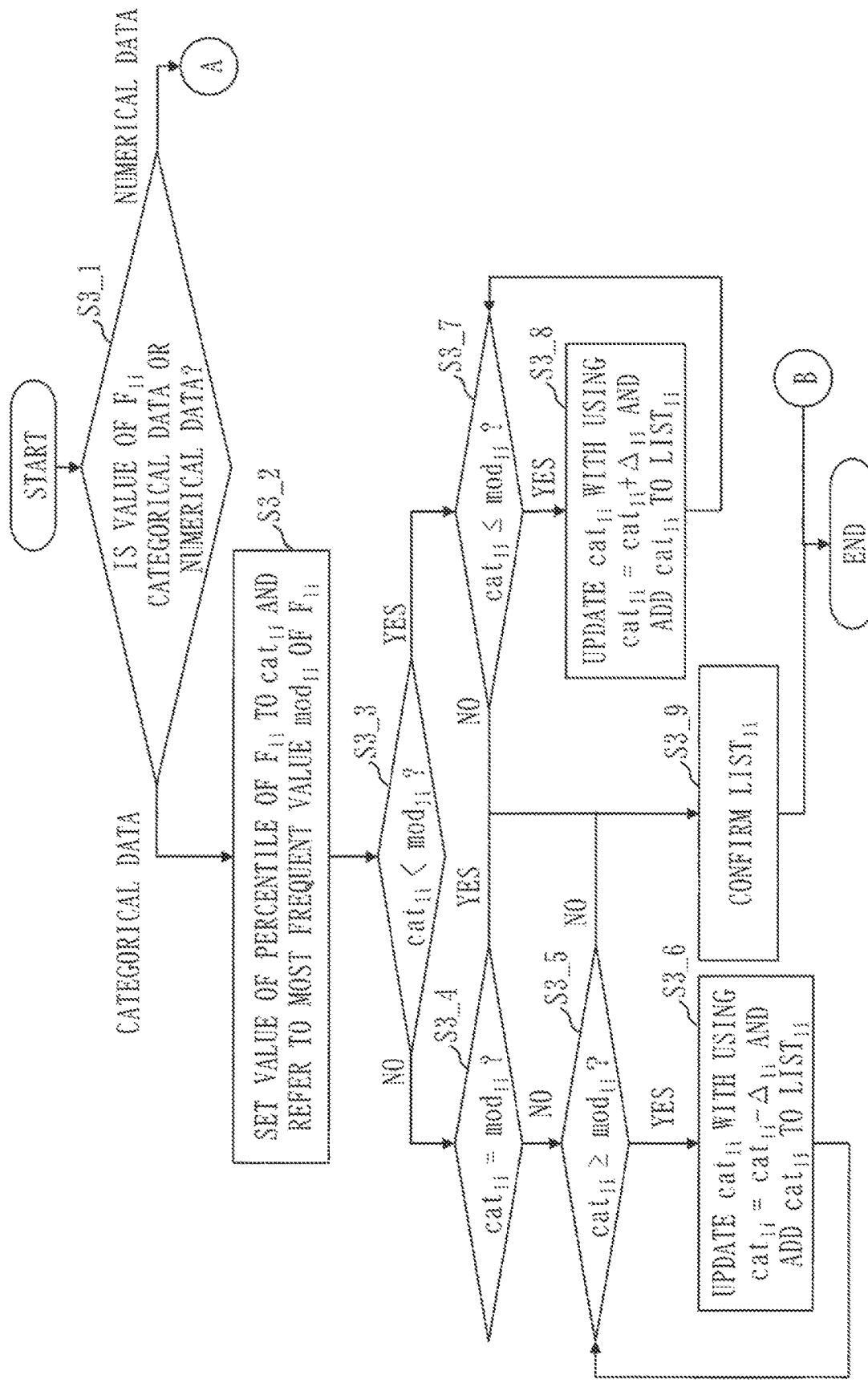
FIG. 10 is a flowchart illustrating an operation example of the feature modification unit according to Embodiment 1.

Although FIG. 10 illustrates an example of using the most frequent value (mod) of the categorical data, other statistical information such as a central value (med) may be used instead of the most frequent value (mod).

Description of Effect of This Embodiment

As described above, in the present embodiment, a feature of a true positive access is modified by using a feature of a true negative access so that a modified true positive access which is the true positive access whose feature has been modified is determined by an attack detection system to be a normal access. Therefore, according to the present embodiment, it is possible to acquire an attack sample of a false negative access that is able to avoid detection operated by the attack detection system. Hence, according to the present embodiment, it is possible to efficiently search for an attack that is actually able to exist in a real space and avoids detection.

Further, in the present embodiment, instead of modifying a feature vector on a feature space, an item of a log is modified on the real space and the modified item of the log is converted into the feature vector. Then, it is checked on the feature space with using the feature vector acquired by the conversion, whether an attack avoids detection or not. However, this ends up with a haphazard search. For this reason, in the present embodiment, a true negative normal log in the vicinity of a true positive attack log is specified on a newly generated feature space and the true positive attack log is modified to have a value of a feature that is often found in the true negative normal log. By doing this, it is possible to avoid the haphazard search.

Embodiment 2

In Embodiment 1, an attack log that is able to avoid detection is efficiently generated by modifying a true positive attack log to have a value of a feature that is often found in a true negative normal log in the vicinity of the true positive attack log. In Embodiment 2, an example will be described in which the attack log that is able to avoid detection is efficiently generated by using a normal log in a false positive state (hereinafter referred to as a false positive normal log) in addition to the true negative normal log.

The false positive normal log is a normal log in which features of a false positive access are described in a plurality of fields. As described above, the false positive access is an access that is known to be a normal access, but that has been mistakenly determined by an attack detection system to be an attack access. The false positive access is an access that causes a false detection in the attack detection system.

In the present embodiment, differences from Embodiment 1 will be mainly described.

Matters not described below are the same as matters described in Embodiment 1.

Description of Configuration

Figure 12:
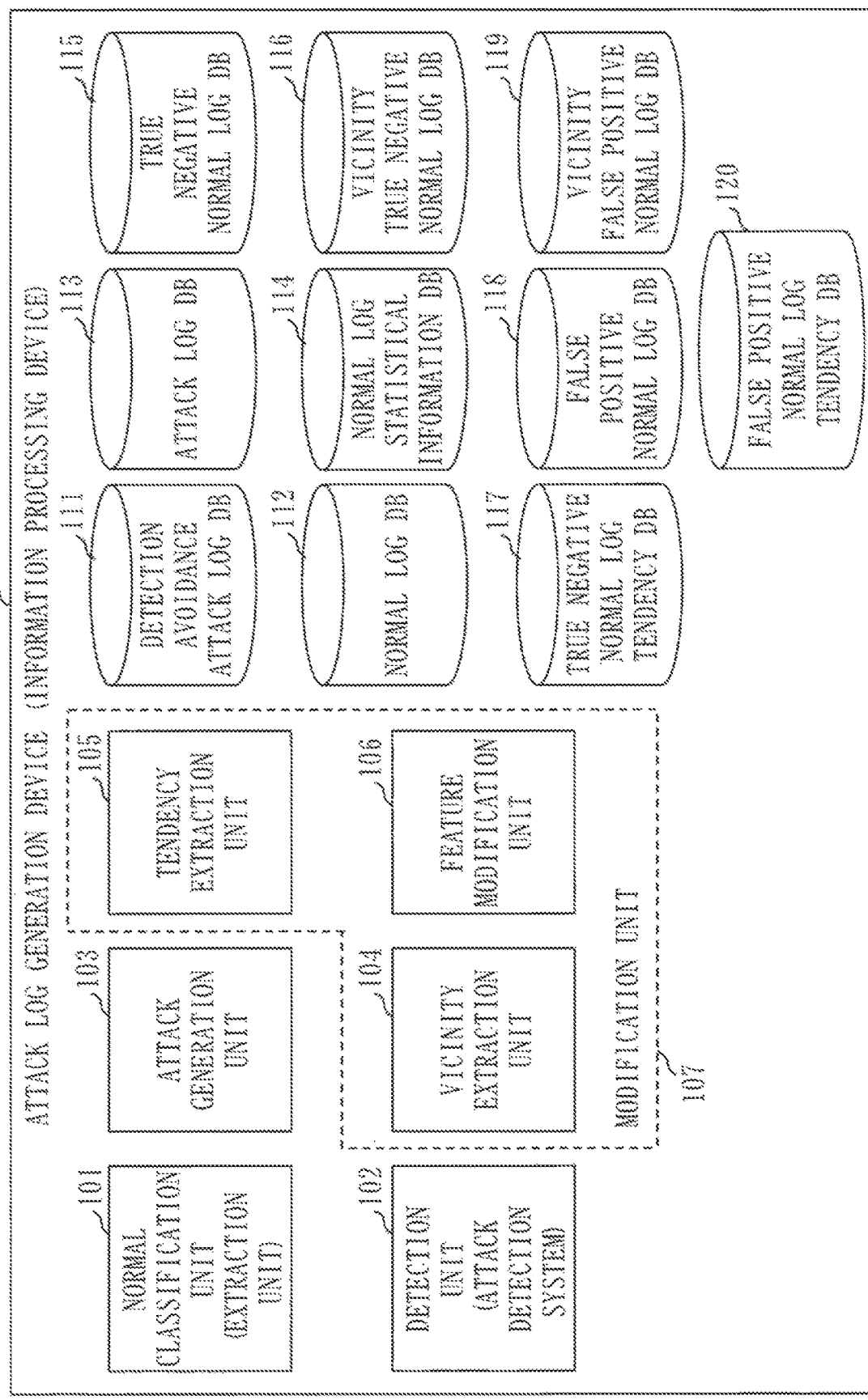
FIG. 12 is a diagram illustrating a functional configuration example of the attack log generation device according to Embodiment 2.

FIG. 12 illustrates a functional configuration example of the attack log generation device 100 according to the present embodiment.

In FIG. 12, a false positive normal log DB 118, a vicinity false positive normal log DB 119 and a false positive normal log tendency DB 120 are added, compared with FIG. 2.

The false positive normal log DB 118 stores false positive normal logs.

The vicinity false positive normal log DB 119 stores vicinity false positive normal logs which are false positive normal logs in the vicinities of true positive attack logs.

The false positive normal log tendency DB 120 stores statistical information on false positive normal logs (hereinafter referred to as false positive normal log statistical information).

The false positive normal log DB 118, the vicinity false positive normal log DB 119, and the false positive normal log tendency DB 120 are, for example, implemented by the main storage device 902 or the auxiliary storage device 903.

In the present embodiment, the normal classification unit 101 classifies normal logs stored in the normal log DB 112 into true negative normal logs and false positive normal logs.

Further, in the present embodiment, the modification unit 107 modifies a feature of a true positive access by using a feature of a true negative access and a feature of a false positive access. That is, the modification unit 107 modifies features of a true positive attack log by using features of a vicinity true negative normal log and features of a vicinity false positive normal log. More specifically, the modification unit 107 modifies the features of the true positive attack log by using features of a vicinity true negative normal log in which a feature that overlaps with the features of the vicinity false positive normal log has been eliminated among the features of the vicinity true negative normal log.

In the present embodiment as well, when the detection unit 102 (attack detection system) determines that the modified true positive access defined in the modified true positive attack log is an attack access, the modification unit 107 modifies the features of the modified true positive attack log by using the features of the vicinity true negative normal log and the features of the vicinity false positive normal log.

Since other configuration elements illustrated in FIG. 12 are the same as those illustrated in FIG. 2, the description thereof will be omitted.

Description of Operation

Figure 13:
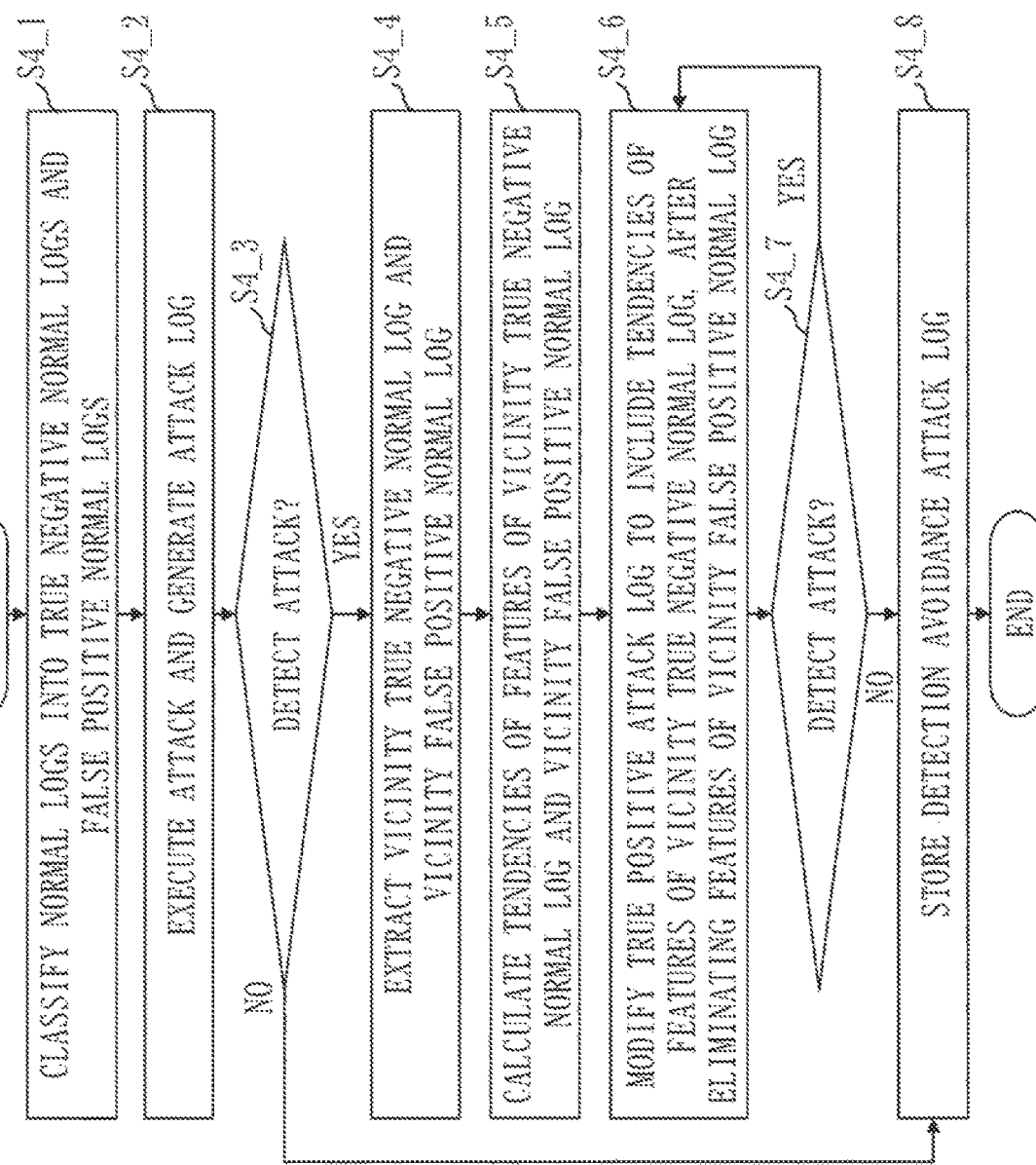
FIG. 13 is a flowchart illustrating an operation example of the attack log generation device according to Embodiment 2.

An operation example of the attack log generation device 100 according to the present embodiment will be described with reference to FIG. 13.

First, the normal classification unit 101 classifies normal logs into true negative normal logs and false positive normal logs (step S4_1).

Specifically, the detection unit 102 analyzes a large number of normal logs stored in advance in the normal log DB 112 and the detection unit 102 determines whether an access defined in a normal log is a normal access or an attack access. Then, the normal classification unit 101 classifies the normal log determined by the detection unit 102 to be the normal access, into the true negative normal log. Further, the normal classification unit 101 classifies the normal log determined by the detection unit 102 to be the attack access, into the false positive normal log.

Then, the normal classification unit 101 stores the true negative normal log in the true negative normal log DB 115 and stores the false positive normal log in the false positive normal log DB 118.

Next, the attack generation unit 103 executes an attack and generates an attack log (step S4_2).

That is, the attack generation unit 103 performs an attack access and generates the attack log in which the features of the attack access are indicated. Then, the attack generation unit 103 stores the generated attack log in the attack log DB 113.

Next, the detection unit 102 analyzes the attack log and determines whether the access defied in the attack log is a normal access or an attack access (step S4_3).

When the detection unit 102 determines that the access defined in the attack log is the normal access (NO in step S4_3), the process proceeds to step S4_8.

In step S4_8, the access determined by the detection unit 102 to be the normal access is the attack access (false negative access) that is able to avoid detection operated by the detection unit 102, so that the normal classification unit 101 stores the corresponding attack log in the detection avoidance attack log DB 111, as the detection avoidance attack log.

On the other hand, when the detection unit 102 determines that the access defined in the attack log is the attack access (YES in step S4_3), the process proceeds to step S4_4.

In step S4_4, the vicinity extraction unit 104 extracts from the true negative normal log DB 115 and the false positive normal log DB 118, a true negative normal log and a false positive normal log in the vicinity of the attack log (true positive attack log) acquired in step S4_3 (step S4_4).

Next, the tendency extraction unit 105 calculates tendencies of features of the vicinity true negative normal log and the vicinity false positive normal log extracted in step S4_4 (step S4_5).

Next, the feature modification unit 106 modifies the true positive attack log so as to include in the true positive attack log, a lot of tendencies of the features of the vicinity true negative normal log but not to include tendencies of the features of the vicinity false positive normal log (step S4_6).

That is, the feature modification unit 106 modifies each field of the true positive attack log by using features of a vicinity true negative normal log in which a feature that overlaps with the features of the vicinity false positive normal log has been eliminated among the features of the vicinity true negative normal log.

Next, the detection unit 102 determines whether the access (modified true positive access) defined in the true positive attack log (modified true positive attack log) which has been modified by the feature modification unit 106, is a normal access or an attack access (step S4_7).

When the detection unit 102 determines that the modified true positive access is the normal access (NO in step S4_7), the normal classification unit 101 stores the modified true positive attack log in the detection avoidance attack log DB 111, as the detection avoidance attack log (step S4_8).

The modified true positive access based on the modified true positive attack log is not able to be detected by the detection unit 102 as an attack, so that the modified true positive access is an attack access that is able to avoid detection operated by the attack detection system. For this reason, the normal classification unit 101 stores the modified true positive attack log in the detection avoidance attack log DB 111, as the detection avoidance attack log.

On the other hand, when the detection unit 102 determines that the modified true positive access is the attack access (YES in step S4_7), the process returns to step S4_6. Then, the feature modification unit 106 further modifies the modified true positive attack log by using the features of the vicinity true negative normal log and the features of the vicinity false positive normal log (step S4_6).

The above is the general flow of the operation of the attack log generation device 100 according to the present embodiment.

The detail of the operation of the normal classification unit 101, the attack generation unit 103, the vicinity extraction unit 104, the tendency extraction unit 105, and the feature modification unit 106 according to the present embodiment will be described below.

The normal classification unit 101 causes the detection unit 102 to determine whether a large number of normal logs prepared in advance in the normal log DB 112 are normal or abnormal. The detection unit 102 determines whether a normal log is normal or abnormal. That is, the detection unit 102 determines whether a feature described in the normal log corresponds to a feature of a normal access or a feature of an attack access.

The normal classification unit 101 extracts a normal log determined by the detection unit 102 to be normal, as the true negative normal log. Then, the normal classification unit 101 stores the extracted true negative normal log in the true negative normal log DB 115. Further, the normal classification unit 101 extracts a normal log determined by the detection unit 102 to be abnormal, as the false positive normal log. Then, the normal classification unit 101 stores the extracted false positive normal log in the false positive normal log DB 118.

Further, the normal classification unit 101 stores normal log statistical information in the normal log statistical information DB 114, as well as Embodiment 1. Since a generation procedure and a storage procedure of the normal log statistical information are as described above in Embodiment 1, the description thereof will be omitted.

Figure 14:
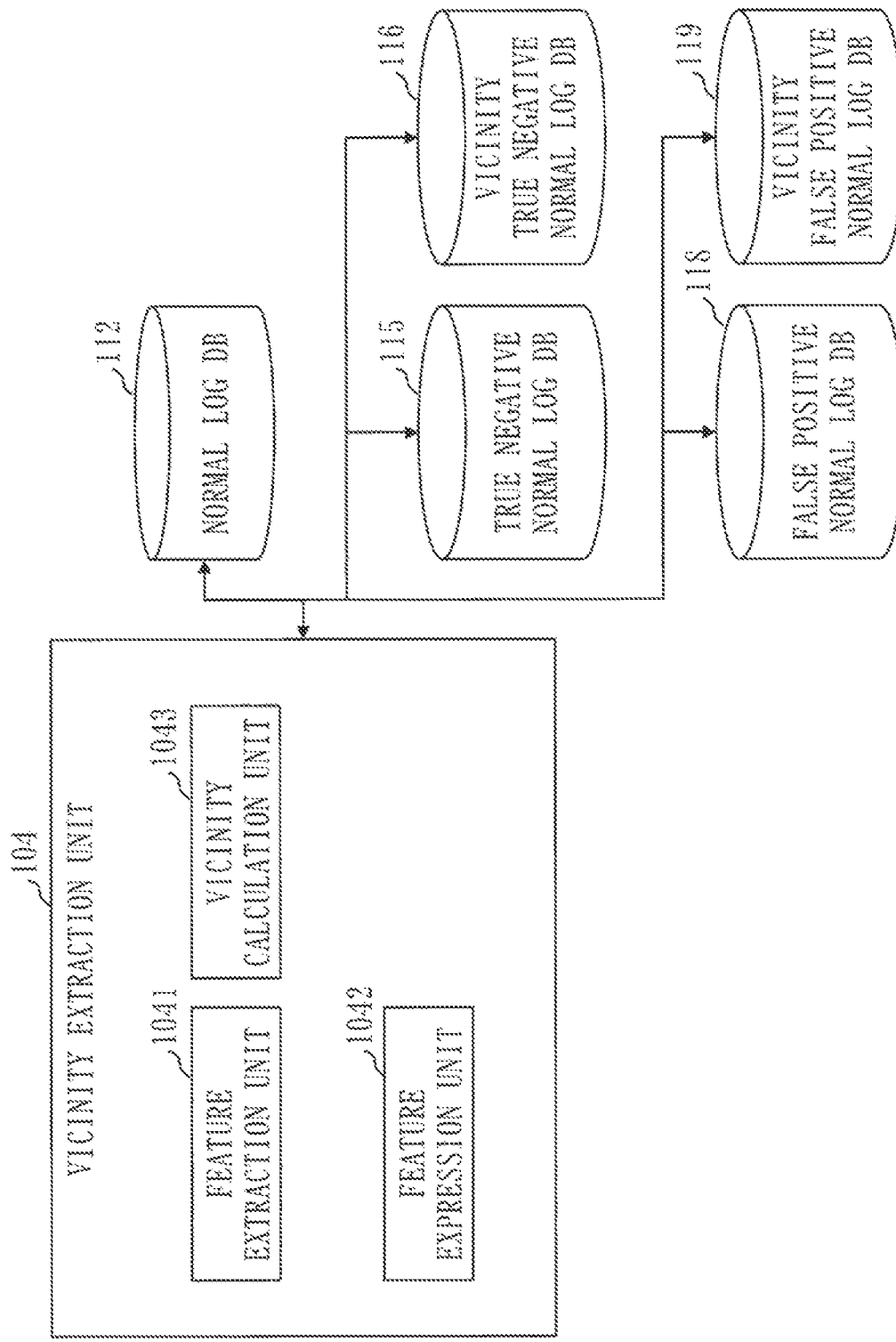
FIG. 14 is a diagram illustrating an internal configuration example of the vicinity extraction unit according to Embodiment 2.
Figure 15:
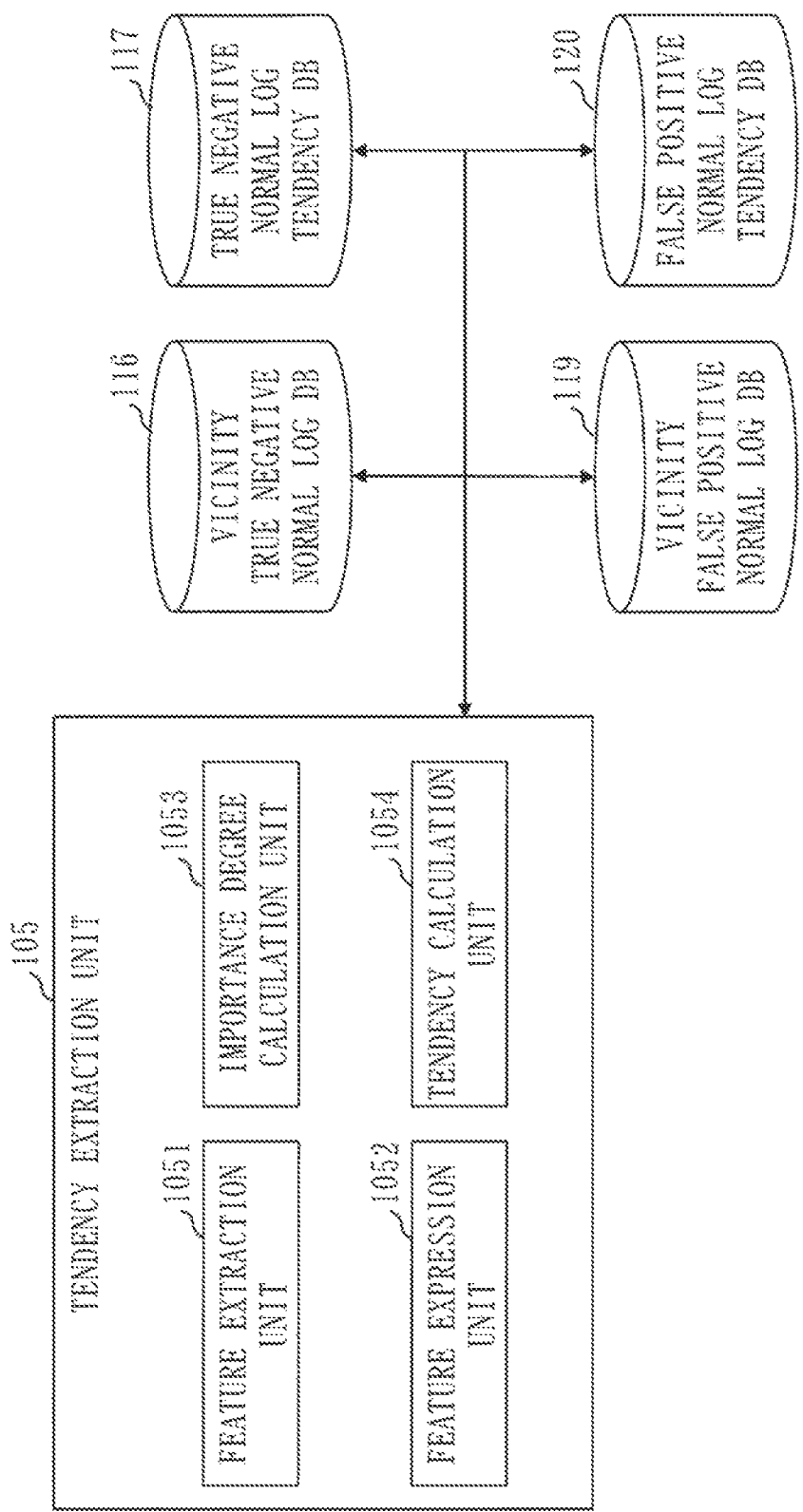
FIG. 15 is a diagram illustrating an internal configuration example of the tendency extraction unit according to Embodiment 2.

FIG. 14 illustrates an internal configuration example of the vicinity extraction unit 104.

As well as Embodiment 1, the vicinity extraction unit 104 is configured with the feature extraction unit 1041, the feature expression unit 1042, and the vicinity calculation unit 1043. In the present embodiment, the vicinity extraction unit 104 uses the normal log DB 112, the true negative normal log DB 115, the vicinity true negative normal log DB 116, the false positive normal log DB 118, and the vicinity false positive normal log DB 119.

The feature extraction unit 1041 extracts prescribed features from true positive attack logs, true negative normal logs and false positive normal logs.

The feature expression unit 1042 converts the features extracted from x pieces of true positive attack logs, $y_0$ pieces of true negative normal logs, and $y_1$ pieces of false positive normal logs, into forms (feature vectors) that are easily processed in a machine learning algorithm. $y_0$ and $y_1$ are numbers sufficiently greater than x. Since a method of converting into the feature vectors is as described in Embodiment 1, the description thereof will be omitted.

The vicinity calculation unit 1043 uses the feature vectors of the true positive attack logs and the feature vectors of the true negative normal logs to specify $K_0$ pieces of vicinity true negative normal logs in the vicinity of each of the true positive attack logs. The total number of true negative normal logs in the vicinity of x pieces of true positive attack logs is assumed to be $K_1$ pieces. $K_1 \geq K_0$. Then, the vicinity calculation unit 1043 stores the specified $K_0$ pieces of vicinity true negative normal logs in the vicinity true negative normal log DB 116.

Further, the vicinity calculation unit 1043 uses the feature vectors of the true positive attack logs and the feature vectors of the false positive normal logs to specify $K_0$ pieces of vicinity false positive normal logs in the vicinity of each of the true positive attack logs. The total number of false positive normal logs in the vicinity of x pieces of true positive attack logs is assumed to be $K_2$ pieces. $K_2 \geq K_0$. Then, the vicinity calculation unit 1043 stores the specified $K_2$ pieces of vicinity false positive normal logs in the vicinity false positive normal log DB 119.

As a method of specifying the vicinity, for example, the vicinity calculation unit 1043 uses the KNN method in the same way as Embodiment 1.

FIG. 5 illustrates an internal configuration example of the tendency extraction unit 105.

As well as Embodiment 1, the tendency extraction unit 105 is configured with the feature extraction unit 1051, the feature expression unit 1052, the importance degree calculation unit 1053, and the tendency calculation unit 1054. In the present embodiment, the tendency extraction unit 105 uses the vicinity true negative normal log DB 116, the true negative normal log tendency DB 117, the vicinity false positive normal log DB 119, and the false positive normal log tendency DB 120.

The feature extraction unit 1051 acquires from the vicinity true negative normal log DB 116, $K_1$ pieces of vicinity true negative normal logs. Further, the feature extraction unit 1051, for example, acquires from the vicinity extraction unit 104, x pieces (assuming one piece) of true positive attack logs.

The feature extraction unit 1051 extracts the prescribed features from $K_1$ pieces of vicinity true negative normal logs and x pieces of true positive attack logs, as with Embodiment 1.

In addition, the feature extraction unit 1051 acquires from the vicinity false positive normal log DB 119, $K_2$ pieces of vicinity false positive normal logs. Further, the feature extraction unit 1051, for example, acquires from the vicinity extraction unit 104, x pieces (assuming one piece) of true positive attack logs.

Then, the feature extraction unit 1051 extracts the prescribed features from $K_2$ pieces of vicinity false positive normal logs and x pieces of true positive attack logs.

As well as Embodiment 1, the feature expression unit 1052 converts the features extracted from $K_1$ pieces of vicinity true negative normal logs and x pieces of true positive attack logs into forms (feature vectors) that are easily processed in a machine leaning algorithm.

In addition, the feature expression unit 1052 converts the features extracted from $K_2$ pieces of vicinity false positive normal logs and x pieces of true positive attack logs, into form (feature vectors) that are easily processed in a machine learning algorithm.

As well as Embodiment 1, the importance degree calculation unit 1053 learns the discriminator ($C_1$), calculates an importance degree of a feature, and extracts features $F_{11}$ to $F_{1n1}$ which are the highest $n_1$ features as to the importance degree.

In addition, the importance degree calculation unit 1053 uses the feature vectors acquired by the feature expression unit 1052 to learn a discriminator ($C_2$) that distinguishes between $K_2$ pieces of vicinity false positive normal logs and x pieces of true positive attack logs. The importance degree calculation unit 1053 calculates for each of the feature vectors of the true positive attack logs, an importance degree of a feature which is a degree of distinguishing by the discriminator ($C_2$) between $K_2$ pieces of vicinity false positive normal logs and x pieces (for example, one piece) of true positive attack logs. The importance degree calculation unit 1053 calculates the feature importance of each of the feature vectors so that higher importance degree is set to a feature which has higher degree of distinguishing between the vicinity false positive normal logs and the true positive attack logs.

Then, the importance degree calculation unit 1053 extracts features $F_{21}$ to $F_{2n1}$ which are the highest $n_2$ features as to the importance degree. $n_2$ is greater than or equal to 1. For example, the importance degree calculation unit 1053 calculates an importance degree with using random forest.

As well as Embodiment 1, the tendency calculation unit 1054 acquires statistical information on the features $F_{11}$ to $F_{1n1}$ of $K_1$ pieces of vicinity true negative normal logs. The tendency calculation unit 1054 stores the statistical information in the true negative normal log tendency DB 117.

In addition, the tendency calculation unit 1054 acquires statistical information on the features $F_{21}$ to $F_{2n1}$ of $K_2$ pieces of vicinity false positive normal logs. The tendency calculation unit 1054 stores the statistical information in the false positive normal log tendency DB 120.

As well as Embodiment 1, the tendency calculation unit 1054 acquires for a feature which is categorical data, a central value (median, $med_2$) and a most frequent value (mode, $mod_1$) of a percentile in the categorical data, as the statistical information. Further, the tendency calculation unit 1054 acquires for a feature which is numerical data, a mean ($\mu_2$) and a standard deviation ($\sigma_2$) of the numerical data, as the statistical information.

Figure 16:
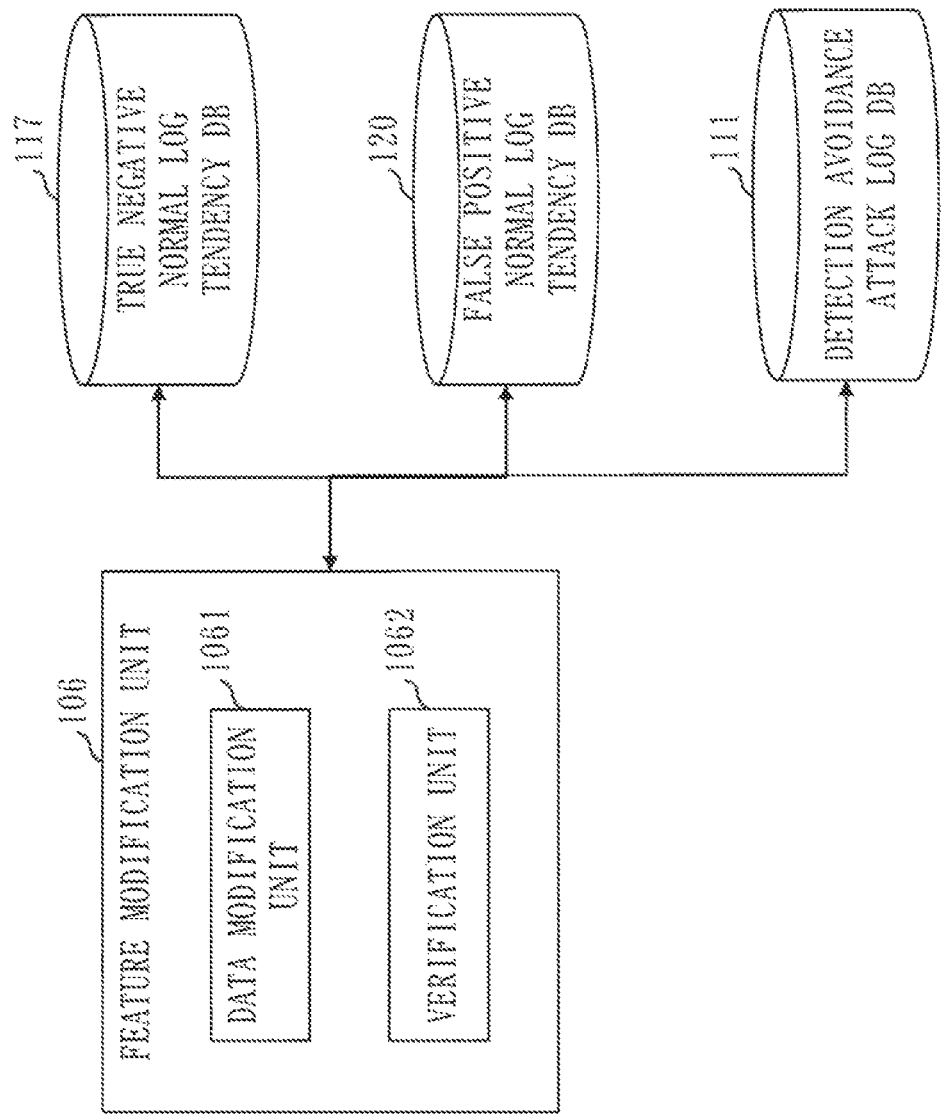
FIG. 16 is a diagram illustrating an internal configuration example of the feature modification unit according to Embodiment 2.

FIG. 16 illustrates an internal configuration example of the feature modification unit 106.

As well as Embodiment 1, the feature modification unit 106 is configured with the data modification unit 1061 and the verification unit 1062. In the present embodiment, the feature modification unit 106 uses the detection avoidance attack log DB 111, the true negative normal log tendency DB 117, and the false positive normal log tendency DB 120.

Figure 17:
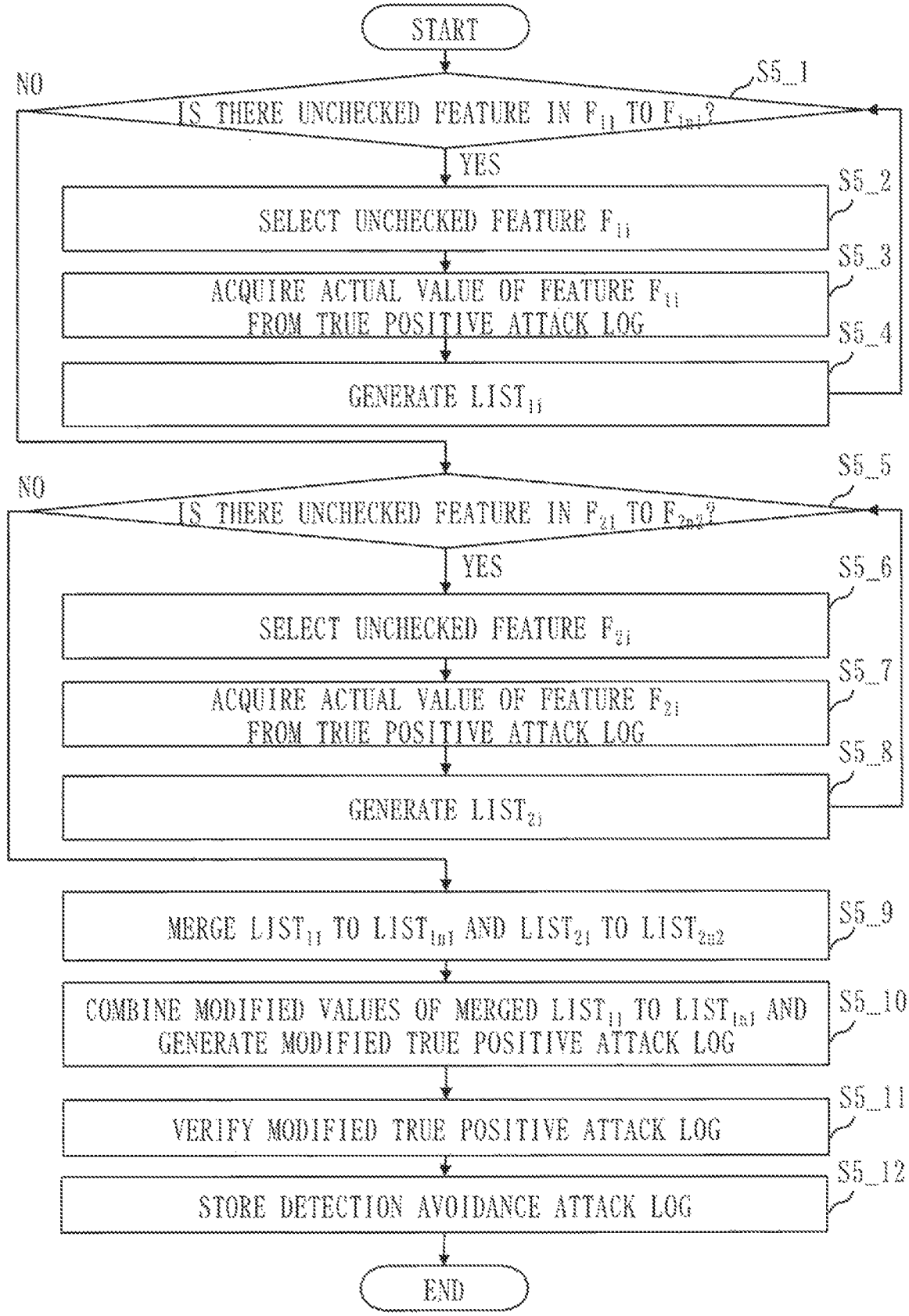
FIG. 17 is a flowchart illustrating an operation example of the feature modification unit according to Embodiment 2.

FIG. 17 illustrates an operation example of the data modification unit 1061 and the verification unit 1062.

Since step S5_1 to step S5_4 are the same as step S2_1 to step S2_4 in FIG. 9, the description thereof will be omitted. Further, a method of generating a $list_{1i}$ in step S5_4 is as illustrated in FIG. and FIG. 11.

Next, the data modification unit 1061 performs the same process for the features $F_{12}$ to $F_{1n1}$ as for the features $F_{11}$ to $F_{1n1}$ to generate a $list_{21}$ to a $list_{2n1}$.

Specifically, the data modification unit 1061 first checks whether there is an unchecked feature among the features $F_{21}$ to $F_{2n1}$ (step S5_5).

When there is the unchecked feature (YES in step S5_5), the data modification unit 1061 selects an unchecked feature $F_{2i}$ (i is any of 1 to n1) (step S5_6). In the following, operation of the data modification unit 1061 will be described in a case where the feature $F_{2i}$ is the feature $F_{21}$, as an example.

Next, the data modification unit 1061 acquires an actual value of the feature $F_{21}$ from a corresponding field in the true positive attack log (step S5_7).

Then, the data modification unit 1061 generates a $list_{21}$ (step S5_8). The $list_{21}$ includes a modified value acquired by modifying the actual value of the feature $F_{21}$ of the true positive attack log with an actual value of the feature $F_{21}$ of the vicinity false positive normal log. That is, the $list_{21}$ includes a plurality of modified values in which values of the feature $F_{21}$ of $K_2$ pieces of vicinity false positive normal logs have been reflected.

A method of generating the $list_{21}$ will be described below.

The data modification unit 1061 also performs for other features $F_{22}$ to $F_{2n1}$, the processes from step S5_5 to step S5_8.

Next, the data modification unit 1061 merges the list $F_{11}$ to the list of the features $F_{11}$ to $F_{1n1}$ and the $list_{21}$ to the $list_{2n1}$ of the features $F_{21}$ to $F_{2n2}$ (step S5_9). A method of merging will be described below.

Next, the data modification unit 1061 combines all modified values included in the merged $list_{11}$ to $list_{2n1}$ and generates an attack log (modified true positive attack log) corresponding to each combination (step S5_10). The actual value of the true positive attack log is hold in a field that does not correspond to the features $F_{11}$ to $F_{1n1}$ and the features $F_{21}$ to $F_{2n2}$.

Next, the verification unit 1062 verifies each modified true positive attack log (step S5_11).

Specifically, the verification unit 1062 causes the detection unit 102 to determine whether the access defined in each modified true positive attack log corresponds to any of a normal access or an attack access.

Then, the verification unit 1062 stores in the detection avoidance attack log DB 111, the modified true positive attack log that has been determined by the detection unit 102 to be the normal access, as the detection avoidance attack log (step S5_12). When X>1, the verification unit 1062 generates detection avoidance attack logs for all true positive attack logs, with using the same method.

Next, a method of generating the list (the $list_{21}$ to the $list_{2n1}$) illustrated in step S5_8 of FIG. 17 will be described with reference to FIG. 18 and FIG. 19. An example of generating the $list_{21}$ for the feature $F_{21}$ will be described below again.

The data modification unit 1061 determines whether the feature $F_{21}$ is categorical data or numerical data (step S6_1).

The categorical data is a domain, a method, a status code, or the like. The numerical data is a request size, a time interval, or the like.

When the feature $F_{21}$ is the categorical data, the data modification unit 1061 acquires from a dictionary in normal log statistical information, a value of a percentile of the categorical data of the feature $F_{21}$ and sets the acquired value of the percentile to $cat_{21}$ (step S6_2). Further, from the false positive normal log tendency DB 120, the data modification unit 1061 refers to a most frequent value $mod_{21}$, as the statistical information on the feature $F_{21}$ of $K_2$ pieces of vicinity false positive normal logs (step S6_2).

Next, the data modification unit 1061 compares a value of $cat_{21}$ with a value of $mod_{21}$ (step S6_3).

When the value of $cat_{21}$ is greater than or equal to the value of $mod_{21}$ (NO in step S6_3), the data modification unit 1061 compares the value of $cat_{21}$ with $(mod_{21}+\tau_{21})$ (step S6_4). $\tau_{21}$ is a prescribed value.

When the value of $cat_{21}$ is less than or equal to $(mod_{21}+\tau_{21})$, the data modification unit 1061 updates the value of $cat_{21}$ so that the value of $cat_{21}$ departs (increases) by $\Delta_{21}$ each from the value of $mod_{21}$ and adds the updated value of $cat_{21}$ to the $list_{21}$ (step S6_5). When the value of $cat_{21}$ has been already listed in the $list_{21}$, the data modification unit 1061 overwrites the already listed value of $cat_{21}$ with the new value of $cat_{21}$. $\Delta_{21}$ is a prescribed value.

The data modification unit 1061 repeats the process of step S6_5 while the value of $cat_{21}$ is less than or equal to a value of $(mod_{21}+\tau_{21})$ (YES in step S6_4).

When the value of $cat_{21}$ is greater than $(mod_{21}+\tau_{21})$ (NO in step S6_4), the process proceeds to step S6_8.

Further, when the value of $cat_{21}$ is less than the value of $mod_{21}$ (YES in step S6_3), the data modification unit 1061 compares the value of $cat_{21}$ with $(mod_{21}-\tau_{21})$ (step S6_6).

When the value of $cat_{21}$ is greater than or equal to $(mod_{21}-\tau_{21})$, the data modification unit 1061 updates the value of $cat_{21}$ so that the value of $cat_{21}$ departs (decreases) by $\Delta_{21}$ each from the value of $mod_{21}$ and adds the updated value of $cat_{21}$ to the $list_{21}$ (step S6_7). When the value of $cat_{21}$ has been already listed in the $list_{21}$, the data modification unit 1061 overwrites the already listed value of $cat_{21}$ with the new value of $cat_{21}$.

The data modification unit 1061 repeats the process step S6_7 while the value of $cat_{21}$ is greater than or equal to a value of $(mod_{21}-\tau_{21})$ (YES in step S6_6).

When the value of $cat_{21}$ is less than $(mod_{21}-\tau_{21})$ (NO in step S6_6), the process proceeds to step S6_8.

In step S6_8, the data modification unit 1061 confirms the $list_{21}$.

In step S6_1, when the feature $F_{21}$ is the numerical data, the data modification unit 1061 sets the value of the numerical data of the feature $F_{21}$ to $num_{21}$ (step S6_9). In addition, from the false positive normal log tendency DB 120, the data modification unit 1061 refer to a mean $\mu_{21}$ and a standard deviation $\sigma_{21}$ as the statistical information on the feature $F_{21}$ of $K_2$ pieces of vicinity false positive normal logs (step S6_9).

Next, the data modification unit 1061 compares a value of $num_{21}$ with a value of $\mu_{21}$ (step S6_10).

When the value of $um_{21}$ is greater than or equal to the value of $\mu_{21}$ (NO in step S6_10), the data modification unit 1061 compares the value of $num_{21}$ with $(\mu_{21}+\tau_{21})$ (step S6_11).

When the value of $num_{21}$ is less than or equal to $(\mu_{21}+\tau_{21})$ (YES in step S6_11), the data modification unit 1061 updates the value of $num_{21}$ so that the value of $num_{21}$ departs (increases) by $\Delta_{21}$ each from the value of $\mu_{21}$ and adds the updated value of $num_{21}$ to the $list_{21}$ (step S6_12). When the value of $num_{21}$ has been already listed in the $list_{21}$, the data modification unit 1061 overwrites the already listed value of $num_{21}$ with the new value of $num_{21}$. $\Delta_{21}$ is a prescribed value. This $\Delta_{21}$ may be the same value as $\Delta_{21}$ used in a case where the feature $F_{21}$ is the categorical data, or may be a different value. $\tau_{21}$ is also a prescribed value. For example, such as $3\times\sigma_{21}$, $\tau_{21}$ is considered to be defined with using a statistical value relating to the feature $F_{21}$.

The data modification unit 1061 repeats the process of step S6_12 while the value of $num_{21}$ is less than or equal to $(\mu_{21}+\tau_{21})$ (YES in step S6_11).

When the value of $num_{21}$ is greater than $(\mu_{21}+\tau_{21})$ (NO in step S6_11), the process proceeds to step S6_15.

Further, the value of $num_{21}$ is less than the value of $\mu_{21}$ (YES in step S6_10), the data modification unit 1061 compares the value of $num_{21}$ with $(\mu_{21}-\tau_{21})$ (step S6_13).

When the value of $num_{21}$ is greater than or equal to $(\mu_{21}-\tau_{21})$ (YES in step S6_13), the data modification unit 1061 updates the value of $num_{21}$ so that the value of $num_{21}$ departs (decreases) by $\Delta_{21}$ each from the value of $\mu_2$ and adds the updated value of $num_{21}$ to the $list_{21}$ (step S6_14). When the value of $num_{21}$ has been already listed in the $list_{21}$, the data modification unit 1061 overwrites the already listed value of $num_{21}$ with the new value of $num_{21}$.

The data modification unit 1061 repeats the process of step S6_14 while the value of $num_{21}$ is greater than or equal to $(\mu_{21}-\tau_{21})$ (YES in step S6_13).

When the value of $num_{21}$ is less than $(\mu_{21}-\tau_{21})$ (NO in step S6_13), the process proceeds to step S6_15.

In step S6_15, the data modification unit 1061 confirms the $list_{21}$.

After that, the data modification unit 1061 generates a $list_{22}$ to a $list_{2n1}$ for features $F_{22}$ to $F_{2n1}$ in the same procedure described above.

Figure 18:
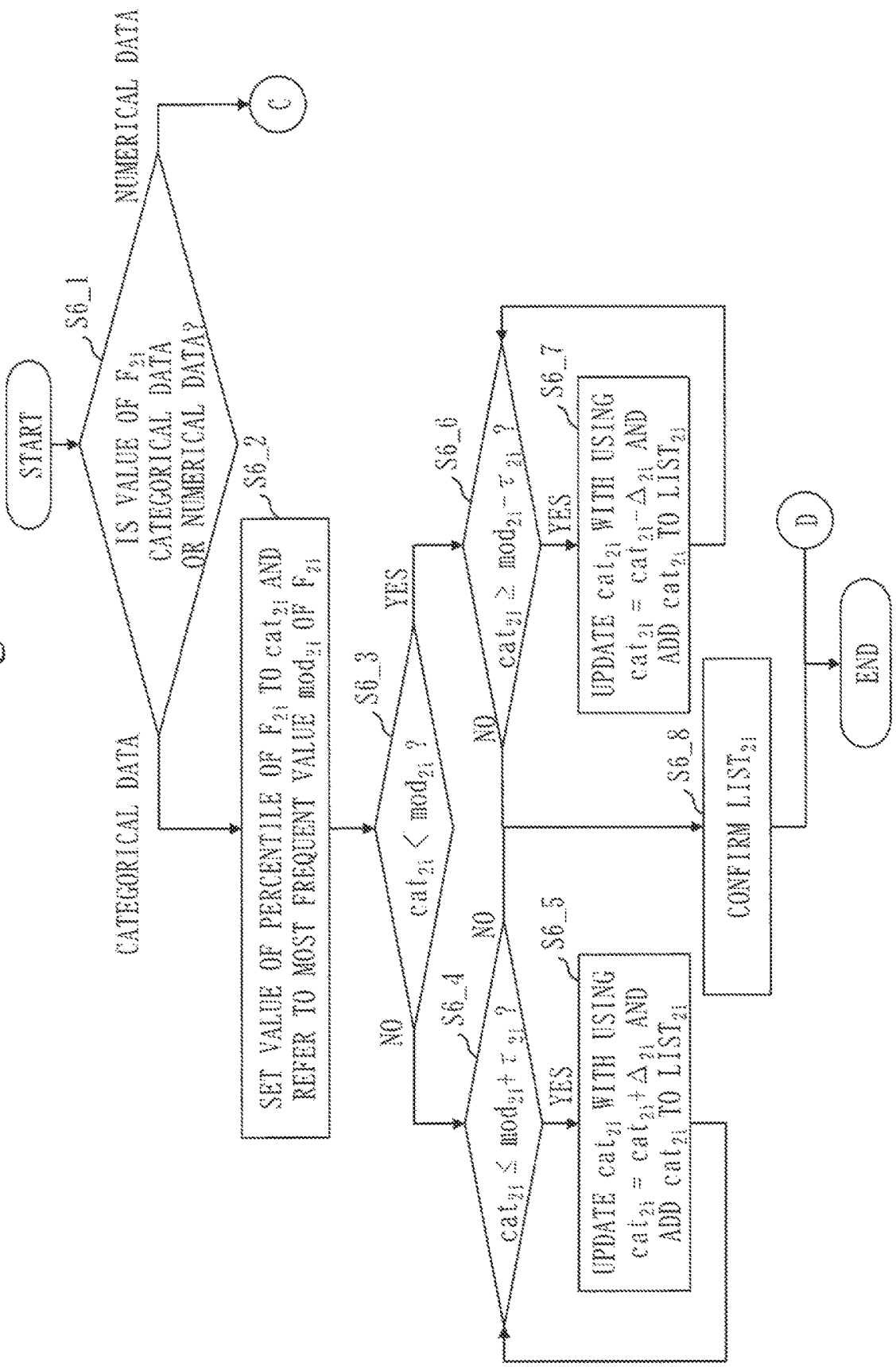
FIG. 18 is a flowchart illustrating an operation example of the feature modification unit according to Embodiment 2.
Figure 19:
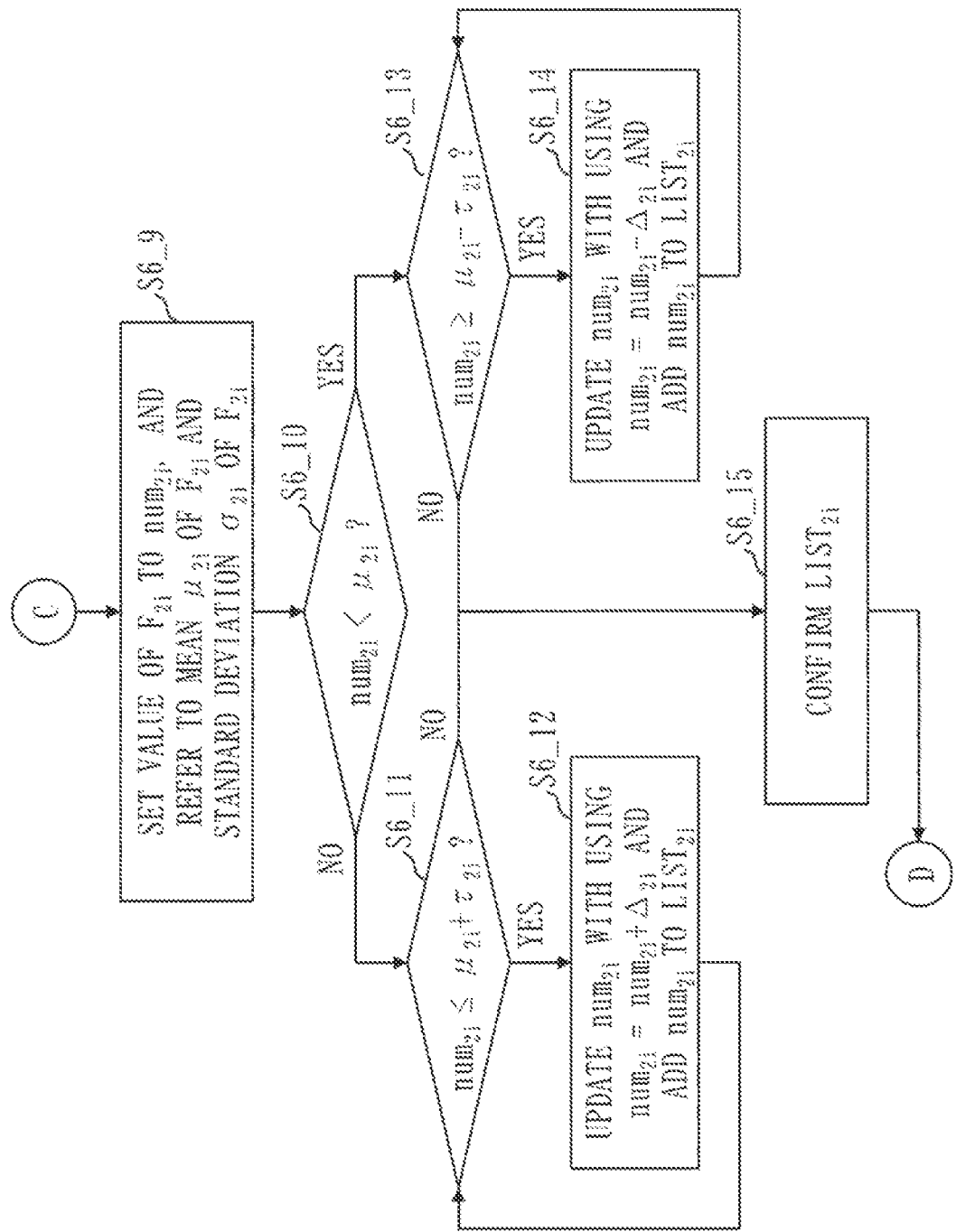
FIG. 19 is a flowchart illustrating an operation example of the feature modification unit according to Embodiment 2.

Although FIG. 18 illustrates an example of using the most frequent value (mod) of the categorical data, other statistical information such as a central value (med) may be used instead of the most frequent value (mod).

Next, a procedure of merging the $list_{11}$ to $list_{1n1}$ of the features $F_{11}$ to $F_{1n1}$ and the $list_{21}$ to the $list_{2n1}$ of the features $F_{21}$ to $F_{2n2}$ will be described. The following description assumes that the number of true positive attack logs (X) is 1, but even when X>1, for all true positive attack logs, lists are merged with using the same method. That is, the $list_{11}$ to the $list_{1n1}$ of the features $F_{11}$ to $F_{1n1}$ generated from the same true positive attack log are merged with the $list_{21}$ to the $list_{2n1}$ of the features $F_{21}$ to $F_{2n1}$.

First, the data modification unit 1061 searches for a feature which is in common between the features $F_{11}$ to $F_{1n1}$ and the features $F_{21}$ to $F_{2n1}$. Here, it is assumed that a feature $F_{11}$ and a feature $F_{23}$ are in common.

When $F_{11}$ and $F_{23}$ are categorical data, the data modification unit 1061 refers to a most frequent value $(mod_{23})$ corresponding to $F_{23}$, from the false positive normal log tendency DB 120. A minimum value and a maximum value of elements of a $list_{23}$ of the feature $F_{23}$ are respectively expressed as $\min(list_{23})$ and $\max(list_{23})$. When $mod_{23}$ is less than $\min(list_{23})$, the data modification unit 1061 deletes from the $list_{11}$, an element which is greater than or equal to $mod_{23}-\alpha$ as well as less than or equal to $\min(list_{23})+\alpha$, among the elements of the $list_{11}$. When $mod_{23}$ is greater than $\max(list_{23})$, the data modification unit 1061 deletes from the $list_{11}$, an element which is greater than or equal to $\max(list_{23})-\alpha$ as well as less than or equal to $mod_{23}+\alpha$, among the elements of the $list_{11}$. $\alpha$ is a prescribed value.

When $F_{11}$ and $F_{23}$ are numerical data, the data modification unit 1061 refers to a mean $(\mu_{23})$ corresponding to $F_{23}$, from the false positive normal log tendency DB 120. A minimum value and a maximum value of elements of a $list_{23}$ of the feature $F_{23}$ are respectively expressed as $\min(list_{23})$ and $\max(list_{23})$. When $\mu_{23}$ is less than $\min(list_{23})$, the data modification unit 1061 deletes from the $list_{11}$, an element which is greater than or equal to $mod_{23}-\beta$ as well as less than or equal to $\min(list_{23})+\beta$, among the elements of the $list_{11}$. When $\mu_{23}$ is greater than $\max(list_{23})$, the data modification unit 1061 deletes from the list$_{11}$, an element which is greater than or equal to max(list$_{23}$)−α as well as less than or equal to mod$_{23}$+α, among the elements of list$_{11}$. ⊖ is a prescribed value. For example, such as 3×σ$_{23}$, β may be defined with using a statistical value relating to F$_{23}$.

The data modification unit 1061 simply merges (combines) a list$_{1i}$ of a feature F$_{1i}$ and a list$_{2i}$ of a feature F$_{2i}$, where F$_{1i}$ and F$_{2i}$ are not in common.

Description of Effect of Embodiment

Also in the present embodiment, it is possible to acquire an attack sample of a false negative access that is able to avoid detection operated by an attack detection system. Further, in the present embodiment, features of a true positive attack log are modified by using features of a vicinity true negative normal log in which a feature that overlaps with a feature of vicinity false positive normal log has been eliminated among features of the vicinity true negative normal log. For this reason, compares with Embodiment 1, it is possible to acquire an attack sample of a false negative access that is more skillfully able to avoid detection.

Embodiments 1 and 2 have been described above and these two embodiments may be implemented in combination.

Alternatively, one of these two embodiments may be partially implemented.

Alternatively, these two embodiments may be partially implemented in combination.

Further, the configurations and procedures described in these two embodiments may be modified as necessary.

Supplementary Description of Hardware Configuration

Finally, a supplementary description of the hardware configuration of the attack log generation device 100 will be given.

The processor 901 illustrated in FIG. 1 is an Integrated Circuit (IC) that performs processing.

The processor 901 is a Central Processing Unit (CPU), a Digital Signal Processor (DSP), or the like.

The main storage device 902 illustrated in FIG. 1 is a Random Access Memory (RAM).

The auxiliary storage device 903 illustrated in FIG. 1 is a Read Only Memory (ROM), a flash memory, a Hard Disk Drive (HDD), or the like.

Further, the auxiliary storage device 903 also stores an Operating System (OS).

Then, at least a part of the OS is executed by the processor 901.

While executing at least the part of the OS, the processor 901 executes the programs which implement the functions of the normal classification unit 101, the detection unit 102, the attack generation unit 103, the vicinity extraction unit 104, the tendency extraction unit 105, and the feature modification unit 106.

By the processor 901 executing the OS, task management, memory management, file management, communication control, and the like are performed.

Further, at least one of information, data, a signal value, and a variable value that indicate results of processes of the normal classification unit 101, the detection unit 102, the attack generation unit 103, the vicinity extraction unit 104, the tendency extraction unit 105, and the feature modification unit 106 is stored in at least one of the main storage device 902, the auxiliary storage device 903, and a register and a cache memory in the processor 901.

Further, the programs that implement the functions of the normal classification unit 101, the detection unit 102, the attack generation unit 103, the vicinity extraction unit 104, the tendency extraction unit 105, and the feature modification unit 106 may be stored in a portable recording medium such as a magnetic disk, a flexible disk, an optical disc, a compact disc, a Blu-ray (registered trademark) disc, or a DVD. Then, the portable recording medium storing the programs that implement the functions of the normal classification unit 101, the detection unit 102, the attack generation unit 103, the vicinity extraction unit 104, the tendency extraction unit 105, and the feature modification unit 106 may be distributed.

Further, the "unit" of each of the normal classification unit 101, the detection unit 102, the attack generation unit 103, the vicinity extraction unit 104, the tendency extraction unit 105, and the feature modification unit 106 may be read as a "circuit", "step", "procedure", "process", or "circuitry".

Further, the attack log generation device 100 may be implemented by a processing circuit. The processing circuit is, for example, a logic Integrated Circuit (IC), a Gate Array (GA), an Application Specific Integrated Circuit (ASIC), or a Field-Programmable Gate Array (FPGA).

In this case, each of the normal classification unit 101, the detection unit 102, the attack generation unit 103, the vicinity extraction unit 104, the tendency extraction unit 105, and the feature modification unit 106 is implemented as a part of the processing circuit.

In this embodiment, a superordinate concept of the processor and the processing circuit is referred to as "processing circuitry".

That is, each of the processor and the processing circuit is a specific example of the "processing circuitry".

REFERENCE SIGNS LIST

100: attack log generation device; 101: normal classification unit; 102: detection unit; 103: attack generation unit; 104: vicinity extraction unit; 105: tendency extraction unit; 106: feature modification unit 107: modification unit; 111: detection avoidance attack log DB; 112: normal log DB; 113: attack log DB; 114: normal log statistical information DB; 115: true negative normal log DB; 116: vicinity true negative normal log DB; 117: true negative normal log tendency DB; 118: false positive normal log DB; 119: vicinity false positive normal log DB; 120: false positive normal log tendency DB; 901: processor; 902: main storage device; 903: auxiliary storage device; 904: keyboard; 905: mouse; 1031: simulated environment; 1032: attack execution unit; 1033: attack module; 1034: attack scenario DB; 1035: log collection unit; 1041: feature extraction unit; 1042: feature expression unit; 1043: vicinity calculation unit; 1051: feature extraction unit; 1052: feature expression unit; 1053: importance degree calculation unit; 1054: tendency calculation unit; 1061: data modification unit; 1062: verification unit

The invention claimed is:

1. An information processing device comprising:
processing circuitry to:
extract, from a database of true positive accesses, a true positive access,
wherein each of the true positive accesses is an access that is known prior to being processed by an access detection system to be an access aimed to attack, and detected by the attack detection system to be an access aimed to attack;

extract, from a database of true negative accesses, a true negative access,
wherein each of the true negative accesses is an access that is
known prior to being processed by the access detection system to be a normal access, and
determined by the attack detection system to be a normal access; and modify a feature of the extracted true positive access by using a feature of the extracted true negative access to increase the likelihood that the access detection system will determine the modified true positive access to be a normal access, wherein the processing circuitry modifies the feature of the true positive access by using the feature of the true negative access and data of a corresponding feature of a false positive access, wherein the false positive access is an access that is
known prior to being processed by an access detection system to be a normal access, and
detected by the attack detection system to be an access aimed to attack.

2. The information processing device according to claim 1, wherein
the processing circuitry modifies the feature of the true positive access so that a modified true positive access which is the true positive access whose feature has been modified is determined by the attack detection system to be a normal access.

3. The information processing device according to claim 1, wherein
when the extracted true positive access which is the true positive access whose feature has been modified is determined by the attack detection system to be an access aimed to attack, the processing circuitry further modifies the feature of the modified true positive access by using the feature of the extracted true negative access.

4. The information processing device according to claim 1, wherein
the processing circuitry extracts from the database of true negative accesses, an access including a feature similar to the particular feature of the true positive access, as the true negative access, and
modifies the data of the particular feature of the true positive access by using the data of the similar corresponding feature of the extracted true negative access.

5. The information processing device according to claim 1, wherein
the processing circuitry selects as the feature to modify from the plurality of features of the true positive access, a feature that matches with a selection condition, and
modifies the selected feature by using the feature of the true negative access.

6. The information processing device according to claim 5, wherein
the processing circuitry calculates for each of the plurality of features, an importance degree of a feature which is a degree of distinguishing between the true positive access and the true negative access, and
selects from the plurality of features, a feature whose importance degree matches with the selection condition.

7. The information processing device according to claim 6, wherein
the processing circuitry calculates an importance degree of each of the plurality of features so that higher importance degree is set to a feature which has higher degree of distinguishing between the true positive access and the true negative access.

8. The information processing device according to claim 1, wherein
when a modified true positive access which is the true positive access whose particular feature has been modified is determined by the attack detection system to be an access aimed to attack, the processing circuitry further modifies the feature of the modified true positive access by using the feature of the false positive access and the feature of the true negative access.

9. The information processing device according to claim 1, wherein
the processing circuitry selects the feature of the true positive access to be modified by eliminating as a possible selection a feature corresponding to a feature of the true negative access that overlaps with a corresponding feature of the false positive access.

10. An information processing method comprising:
extracting, from a database of true positive accesses, a true positive access,
wherein each of the true positive accesses is an access that is
known prior to being processed an access detection system to be an access aimed to attack, and
detected by the attack detection system to be an access aimed to attack;
extracting, from a database of true negative accesses, a true negative access,
wherein each of the true negative accesses is an access that is
known prior to being processed by the access detection system to be a normal access, and
determined by the attack detection system to be a normal access; and
modifying a feature of the extracted true positive access by using a feature of the extracted true negative access to increase the likelihood that the attack detection system will determine the modified true positive access to be a normal access,
wherein the modifying step modifies the feature of the true positive access by using the feature of the true negative access and data of a corresponding feature of a false positive access,
wherein the false positive access is an access that is
known prior to being processed by an access detection system to be a normal access, and
detected by the attack detection system to be an access aimed to attack.

11. A non-transitory computer readable medium storing an information processing program for causing a computer to execute:
an extraction process to extract, from a database of true positive accesses, a true positive access,
wherein each of the true positive accesses is an access that is
known prior to being processed by an access detection system to be an access aimed to attack, and
detected by the attack detection system to be an access aimed to attack;
a second extraction process to extract, from a database of true negative accesses, a true negative access, wherein each of the true negative accesses is an access that is
 known before being processed by the access detection system to be a normal access, and
 determined by the attack detection system to be a normal access; and
a modification process to modify a feature of the extracted true positive access by using a feature of the extracted true negative access to increase the likelihood that the attack detection system will determine the modified true positive access to be a normal access,
wherein the modification process modifies the feature of the true positive access by using the feature of the true negative access and data of a corresponding feature of a false positive access,
wherein the false positive access is an access that is
 known prior to being processed by an access detection system to be a normal access, and
 detected by the attack detection system to be an access aimed to attack.

* * * * *